US007363543B2

(12) United States Patent
Peebles et al.

(10) Patent No.: US 7,363,543 B2
(45) Date of Patent: *Apr. 22, 2008

(54) METHOD AND APPARATUS FOR GENERATING DIAGNOSTIC RECOMMENDATIONS FOR ENHANCING PROCESS PERFORMANCE

(75) Inventors: Harold L. Peebles, Acton, MA (US); George Demetriou, Westford, MA (US); Carol S. Zimmet, Boxboro, MA (US); Lori J. Davidson, Stoneham, MA (US); James H. Grigsby, Raleigh, NC (US); Nirmala Venkatraman, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 10/135,775

(22) Filed: Apr. 30, 2002

(65) Prior Publication Data

US 2003/0204789 A1      Oct. 30, 2003

(51) Int. Cl.
*G06F 11/00* (2006.01)
(52) U.S. Cl. .......................... 714/26; 714/47
(58) Field of Classification Search .................. 714/47, 714/26
See application file for complete search history.

(56) References Cited

U.S. PATENT DOCUMENTS

| 5,621,663 | A | * | 4/1997 | Skagerling | .................. 702/186 |
| 5,732,240 | A | | 3/1998 | Caccavale | |
| 5,819,028 | A | | 10/1998 | Manghirmalani et al. | |
| 5,974,237 | A | | 10/1999 | Schurmer et al. | |
| 6,085,244 | A | | 7/2000 | Wookey | |
| 6,108,800 | A | * | 8/2000 | Asawa | ........................ 714/47 |
| 6,115,393 | A | | 9/2000 | Engel et al. | |
| 6,145,001 | A | | 11/2000 | Scholl et al. | |

(Continued)

FOREIGN PATENT DOCUMENTS

EP     0 831 617 A2    3/1998

(Continued)

*Primary Examiner*—Yolanda L Wilson
(74) *Attorney, Agent, or Firm*—McGuinness & Manaras LLP

(57) ABSTRACT

A diagnostic system monitors the status of other processes over a computer network by collecting status and configuration data, analyzing the data and providing diagnostic recommendations when necessary. The diagnostic system includes a collector module, an analyzer module and an administration client module. The collector module collects statistical data and configuration data from each monitored process and populates a plurality of source data tables or worksheets. The values of the source data are processed by the analyzer module, including component algorithms, which generate a plurality of individual component indexes each associated with a specific aspect of the processes performance. The component indexes are then processed using a weighting algorithm to form a composite index reflecting the overall health of the monitored process. If one or more of the component index values exceed a predefined threshold, the indexes and configuration data are provided to an overall assessment table which identifies the process state which is true and generates one or more diagnostic recommendations, the output of which is stored in memory and is directly accessible to the administration client module. The administration client module enables the display, upon user query, of any of the source data, configuration data, component and composite indexes, and diagnostic recommendations in a variety of different formats as well as searching for the same using any number of specific queries.

33 Claims, 27 Drawing Sheets

U.S. PATENT DOCUMENTS

| | | |
|---|---|---|
| 6,237,114 B1 * | 5/2001 | Wookey et al. ............... 714/47 |
| 6,271,845 B1 | 8/2001 | Richardson |
| 6,327,677 B1 * | 12/2001 | Garg et al. .................... 714/37 |
| 6,363,421 B2 | 3/2002 | Barker et al. |
| 6,377,907 B1 | 4/2002 | Waclawski et al. |
| 6,425,006 B1 | 7/2002 | Chari et al. |
| 6,467,052 B1 * | 10/2002 | Kaler et al. ................... 714/39 |
| 6,557,036 B1 | 4/2003 | Kavacheri et al. |
| 6,643,613 B2 | 11/2003 | McGee et al. |
| 6,738,811 B1 * | 5/2004 | Liang ......................... 709/224 |
| 6,792,460 B2 | 9/2004 | Oulu et al. |
| 6,900,822 B2 * | 5/2005 | Germain et al. ............ 715/736 |
| 2002/0042896 A1 * | 4/2002 | Johnson et al. ............... 714/47 |
| 2002/0112044 A1 | 8/2002 | Hessmer et al. |
| 2002/0133757 A1 * | 9/2002 | Bertram et al. ............... 714/47 |
| 2002/0194319 A1 | 12/2002 | Ritchie |
| 2002/0198984 A1 | 12/2002 | Goldstein et al. |
| 2003/0110252 A1 | 6/2003 | Yang-Huffman |
| 2004/0103181 A1 | 5/2004 | Chambliss et al. |

FOREIGN PATENT DOCUMENTS

| | | |
|---|---|---|
| EP | 1 274 262 A1 | 1/2003 |
| GB | 2 389 978 A | 12/2003 |

* cited by examiner

| The Notes Analyzer-[DOMMON.IMP] |
|---|
| File Edit Create View Worksheet Tools Window Help |
| Config Truth Main \ Config Truth Table Task \ Const \ Debug Rec Text \ Formula CPU \Utilization\Formula-Disk \Formula-HTTP Reponse\ |

| | | Is Component Enabled | | | | | | | | | |
|---|---|---|---|---|---|---|---|---|---|---|---|
| 450 | | e CPU Utiliza-tion | e Mail Delivers Latency | e Memory Utiliza-tion | e Server Response | e Disk Utiliza-tion | e Network Utiliza-tion | e NRPC Name lookup | e HTTP Response | e LDAP Response | e IMAP Response |
| Never Seen | | | | | | | | | | | |
| Workstation CPU Saturate | | | | | | | | | | | |
| Db Server 5 | | | | | 1 | | | | | | |
| Db Server 4 | | | | | 1 | | | | | | |
| Mail-Router 3 | | 1 | | | | | | | | | |
| Mail-Router enabled not | | 1 | | | | | | | | | |
| Mail-Router 4 | | 1 | | | | | | | | | |
| Mail-Router 5 | | 1 | | | | | | | | | |
| Task HTTP 1 | | | | | | | | | | | |
| Task HTTP 2 | | | | | | | | | | 1 | | |
| Task HTTP 3 | | | | | | | | | | 1 | | |
| Task HTTP 4 | | | | | | | | | | 1 | | |
| Task LDAP 1 | | | | | | | | | | 1 | | |
| Task LDAP 2 | | | | | | | | | | | 1 | |
| Task LDAP 3 | | | | | | | | | | | 1 | |
| Task LDAP 4 | | | | | | | | | | | 1 | |
| Task IMAP 1 | | | | | | | | | | | 1 | |
| Task IMAP 2 | | | | | | | | | | | | 1 |
| Task IMAP 3 | | | | | | | | | | | | 1 |
| Task IMAP 4 | | | | | | | | | | | | 1 |
| Mem Crit-AIX | | | | 1 | | | | | | | | |
| Term B384 | | | | 1 | | | | | | | | |
| Mem Cnt-AS400 | | | | 1 | | | | | | | | |
| Item B386 | | | | 1 | | | | | | | | |
| Mem Crit Solaris | | | | 1 | | | | | | | | |
| Item B388 | | | | 1 | | | | | | | | |
| Mem Crit-NT | | | | 1 | | | | | | | | |
| Item B390 | | | | 1 | | | | | | | | |
| Mem Crit-Win2K | | | | 1 | | | | | | | | |
| Item B392 | | | | 1 | | | | | | | | |
| Item B393 | | | | 1 | | | | | | | | |
| Item B394N | | | | 1 | | | | | | | | |
| Need Mem-AIX | | | | 1 | | | | | | | | |
| Need Mem-AIX 2 | | | | 1 | | | | | | | | |
| Need Mem-A6400 | | | | 1 | | | | | | | | |
| Need Mem-A6400 2 | | | | 1 | | | | | | | | |
| Need Mem-Sol | | | | 1 | | | | | | | | |
| Need Mem-Sol 2 | | | | 1 | | | | | | | | |
| Need Mem-NT | | | | 1 | | | | | | | | |
| Need Mem-NT 2 | | | | 1 | | | | | | | | |
| Need Mem-Win2K | | | | 1 | | | | | | | | |
| Need Mem-Win2K 2 | | | | 1 | | | | | | | | |
| Need Mem 1 | | | | 1 | | | | | | | | |
| Need Mem 2 | | | | 1 | | | | | | | | |
| Situations | | | | | | | | | | | | |
| | | // Note: Any item names with a "Y" in the suffix represents a "Significant/Yellow" condition | | | | | | | | | | |
| | 1 | | | | | | | | | | | |
| | 2 | In entry ID, Situations[1]=1 | | | | | | | | | | |
| ☐ | 3 | In entry ID, Situations[THIS]=Situations[PREM]+1 | | | | | | | | | | |
| ☐ | 4 | | | | | | | | | | | |
| Arial | | 9 | General | | | | C:\NOTESRG\DATA | | | | | |

*Figure 6A-1*

| | | | | Component indices | | | | | | |
|---|---|---|---|---|---|---|---|---|---|---|
| Overall | CPU Utilization | Mail Delivery Latency Rating | Memory Utilization | Server Response | Disk Utilization | Network Utilization | Addressee Utilization | HTTP Reponse | LDAP Response | IMAP Response |
| 0 | | | | | | | | | | |
| 7 | | | | | | | | | | |
| | | | | 5 | | | | | | |
| | | | | 4 | | | | | | |
| | | 5 | | | | | | | | |
| | | 5 | | | | | | | | |
| | | 4 | | | | | | | | |
| | | 4 | | | | | | | | |
| | | | | | | | | 5 | | |
| | | | | | | | | 5 | | |
| | | | | | | | | 5 | | |
| | | | | | | | | 4 | | |
| | | | | | | | | | 5 | |
| | | | | | | | | | 5 | |
| | | | | | | | | | 5 | |
| | | | | | | | | | 4 | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |
| | | 3 | | | | | | | | |

Formula\MAP Reponse\Formula+LOAP Response\ Formula Mail Disk

Beach group

*Figure 6A-2*

The Notes Analyzer-[DOMMON.IMP]
File Edit Create View Worksheet Tools Window Help
Config Truth Main \ Config Truth Table Task \ Const \ \\Utilization\Formula-Disk \Formula-HTTP

|  | Indicies | Server Task States | | | | | | |
|---|---|---|---|---|---|---|---|---|
|  | θ IMAP Response | DB Server | HTTP Web Server | IMAP Mail Server | LDAP Server | Router | OS Type | Need mail .box |
| Never Seen | 2 | | | | | | | |
| Workstation CPU Saturate | 6 | | | | | | | |
| Db Server 5 | | | | | | | 2 | |
| Db Server 4 | | | | | | | 0 | |
| Mail-Router 3 | | | | | | | 6 | |
| Mail-Router enabled not | | | | | | | 1 | |
| Mail-Router 4 | | | | | | | | |
| Mail-Router 5 | | | | | | | | |
| Task HTTP 1 | | | 0 | | | | | |
| Task HTTP 2 | | | 1 | | | | | |
| Task HTTP 3 | | | 2 | | | | | |
| Task HTTP 4 | | | 6 | | | | | |
| Task LDAP 1 | 5 | | | | 0 | | | |
| Task LDAP 2 | 5 | | | | 1 | | | |
| Task LDAP 3 | 5 | | | | 2 | | | |
| Task LDAP 4 | 4 | | | | 6 | | | |
| Task IMAP 1 | 5 | | | 0 | | | | |
| Task IMAP 2 | 5 | | | 1 | | | | |
| Task IMAP 3 | 5 | | | 2 | | | | |
| Task IMAP 4 | 4 | | | 6 | | | | |
| Mem Crit-AIX | | | | | | | 4 | |
| Term B384 | | | | | | | 4 | |
| Mem Cnt-AS400 | | | | | | | 6 | |
| Item B386 | | | | | | | 6 | |
| Mem Crit Solaris | | | | | | | 3 | |
| Item B388 | | | | | | | 3 | |
| Mem Crit-NT | | | | | | | 1 | |
| Item B390 | | | | | | | 1 | |
| Mem Crit-Win2K | | | | | | | 2 | |
| Item B392 | | | | | | | 2 | |
| Item B393 | | | | | | | | |
| Item B394N | | | | | | | | |
| Need Mem-AIX | | | | | | | 4 | |
| Need Mem-AIX 2 | | | | | | | 4 | |
| Need Mem-A6400 | | | | | | | 6 | |
| Need Mem-A6400 2 | | | | | | | 6 | |
| Need Mem-Sol | | | | | | | 3 | |
| Need Mem-Sol 2 | | | | | | | 3 | |
| Need Mem-NT | | | | | | | 1 | |
| Need Mem-NT 2 | | | | | | | 1 | |
| Need Mem-Win2K | | | | | | | 2 | |
| Need Mem-Win2K 2 | | | | | | | 2 | |
| Need Mem 1 | | | | | | | | |
| Need Mem 2 | | | | | | | | |

Situations
1  // Note: Any item names with a "Y" in the suffix represents a "Significant/Yellow" condition
2
☐ 3  In entry ID, Situations[1]=1
☐ 4  In entry ID, Situations[THIS]=Situations[PREM]+1

Arial | 9 | General | C:\NOTESRG\DATA

| | Search Group | | | | | | | | |
|---|---|---|---|---|---|---|---|---|---|
| | Recommendation Minor Blends | | | | | | | | |
| 450 | High CPU Queue | Too Many Users | Add Http Threads | Disable HTTP Log | LDAP from QOS | LTTP from Q)S | Disk Metric | Add Network Bandwidth | High Network Collision |
| Never Seen | | | | | | | | | |
| Workstation CPU Saturate | | | | | | | | | |
| Db Server 5 | | | | | | | | | |
| Db Server 4 | | | | | | | | | |
| Mail-Router 3 | | | | | | | | | |
| Mail-Router enabled not | | | | | | | | | |
| Mail-Router 4 | | | | | | | | | |
| Mail-Router 5 | | | | | | | | | |
| Task HTTP 1 | | | | | | | | | |
| Task HTTP 2 | | | | | | | | | |
| Task HTTP 3 | | | | | | | | | |
| Task HTTP 4 | | | | | | | | | |
| Task LDAP 1 | | | | | | | | | |
| Task LDAP 2 | | | | | | | | | |
| Task LDAP 3 | | | | | | | | | |
| Task LDAP 4 | | | | | | | | | |
| Task IMAP 1 | | | | | | | | | |
| Task IMAP 2 | | | | | | | | | |
| Task IMAP 3 | | | | | | | | | |
| Task IMAP 4 | | | | | | | | | |
| Mem Crit-AIX | | | | | | | | | |
| Term B384 | | | | | | | | | |
| Mem Cnt-AS400 | | | | | | | | | |
| Item B386 | | | | | | | | | |
| Mem Crit Solaris | | | | | | | | | |
| Item B388 | | | | | | | | | |
| Mem Crit-NT | | | | | | | | | |
| Item B390 | | | | | | | | | |
| Mem Crit-Win2K | | | | | | | | | |
| Item B392 | | | | | | | | | |
| Item B393 | | | | | | | | | |
| Item B394N | | | | | | | | | |
| Need Mem-AIX | | | | | | | | | |
| Need Mem-AIX 2 | | | | | | | | | |
| Need Mem-A6400 | | | | | | | | | |
| Need Mem-A6400 2 | | | | | | | | | |
| Need Mem-Sol | | | | | | | | | |
| Need Mem-Sol 2 | | | | | | | | | |
| Need Mem-NT | | | | | | | | | |
| Need Mem-NT 2 | | | | | | | | | |
| Need Mem-Win2K | | | | | | | | | |
| Need Mem-Win2K 2 | | | | | | | | | |
| Need Mem 1 | | | | | | | | | |
| Need Mem 2 | | | | | | | | | |

Situations

// Note: Any item names with a "Y" in the suffix represents a "Significant/Yellow" condition 1
2  In entry ID, Situations{1}=1
3  In entry ID, Situations[THIS]=Situations[PREM]+1
4

Figure 6C-1

| Over 100% Network Bandwidth Util | More View Rebuild Dir | Recommendation Codes | | | | | | |
|---|---|---|---|---|---|---|---|---|
| | | | | Short Term - 460 | | | | |
| | | Code 1 | Code 2 | Code 3 | Code 4 | Code 5 | Code 6 | Code 7 | Code 8 |
| | | | | 1001 | | | | | |
| | | | | 2004 | 2005 | | | | |
| | | | | 1000 | | | | | |
| | | | | 1000 | | | | | |
| | | | | 1000 | | | | | |
| | | | | 101 | | | | | |
| | | | | 1000 | | | | | |
| | | | | 1000 | | | | | |
| | | | | 702 | | | | | |
| | | | | 702 | | | | | |
| | | | | 1000 | | | | | |
| | | | | 801 | | | | | |
| | | | | 801 | | | | | |
| | | | | 1000 | | | | | |
| | | | | 1000 | | | | | |
| | | | | 901 | | | | | |
| | | | | 901 | | | | | |
| | | | | 1000 | | | | | |
| | | | | 1000 | | | | | |
| | | | | 201 | | | | | |
| | | | | 201 | 202 | 204 | | | |
| | | | | 201 | 204 | 203 | | | |
| | | | | 201 | 202 | 202 | | | |
| | | | | 201 | 203 | 206 | | | |
| | | | | 201 | 202 | 203 | | | |
| | | | | 201 | 203 | 206 | | | |
| | | | | 201 | 202 | 203 | | | |
| | | | | 201 | 203 | 206 | | | |
| | | | | 201 | 202 | 203 | | | |
| | | | | 201 | 203 | 206 | | | |
| | | | | 201 | 202 | 203 | | | |
| | | | | 201 | 203 | 206 | 203 | | |
| | | | | 201 | 202 | 204 | 206 | | |
| | | | | 201 | 204 | 203 | 205 | | |
| | | | | 201 | 202 | 203 | 206 | | |
| | | | | 201 | 203 | | | | |
| | | | | 201 | 202 | 203 | 208 | | |
| | | | | 201 | 203 | | | | |
| | | | | 201 | 202 | 203 | 208 | | |
| | | | | 201 | 203 | | | | |
| | | | | 201 | 202 | 203 | 208 | | |
| | | | | 201 | 203 | | | | |
| | | | | 201 | 202 | 203 | 203 | | |
| | | | | 201 | 203 | | | | |

*Figure 6C-2*

| | Long Term | | | | | | |
|---|---|---|---|---|---|---|---|
| 450 | Code 1 | Code2 | Code 3 | Code 4 | Code 5 | Code 6 | Code 7 |
| Never Seen | | | | | | | |
| Workstation CPU Saturate | | | | | | | |
| Db Server 5 | | | | | | | |
| Db Server 4 | | | | | | | |
| Mail-Router 3 | | | | | | | |
| Mail-Router enabled not | | | | | | | |
| Mail-Router 4 | | | | | | | |
| Mail-Router 5 | | | | | | | |
| Task HTTP 1 | | | | | | | |
| Task HTTP 2 | | | | | | | |
| Task HTTP 3 | | | | | | | |
| Task HTTP 4 | | | | | | | |
| Task LDAP 1 | | | | | | | |
| Task LDAP 2 | | | | | | | |
| Task LDAP 3 | | | | | | | |
| Task LDAP 4 | | | | | | | |
| Task IMAP 1 | | | | | | | |
| Task IMAP 2 | | | | | | | |
| Task IMAP 3 | | | | | | | |
| Task IMAP 4 | | | | | | | |
| Mem Crit-AIX | | | | | | | |
| Term B384 | | | | | | | |
| Mem Cnt-AS400 | | | | | | | |
| Item B386 | | | | | | | |
| Mem Crit Solaris | | | | | | | |
| Item B388 | | | | | | | |
| Mem Crit-NT | | | 205 | | | | |
| Item B390 | | | 205 | | | | |
| Mem Crit-Win2K | | | 205 | | | | |
| Item B392 | | | 205 | | | | |
| Item B393 | | | | | | | |
| Item B394N | | | | | | | |
| Need Mem-AIX | | | | | | | |
| Need Mem-AIX 2 | | | | | | | |
| Need Mem-A6400 | | | | | | | |
| Need Mem-A6400 2 | | | | | | | |
| Need Mem-Sol | | | | | | | |
| Need Mem-Sol 2 | | | | | | | |
| Need Mem-NT | | | 205 | | | | |
| Need Mem-NT 2 | | | 205 | | | | |
| Need Mem-Win2K | | | 205 | | | | |
| Need Mem-Win2K 2 | | | 205 | | | | |
| Need Mem 1 | | | | | | | |
| Need Mem 2 | | | | | | | |

Situations

// Note: Any item names with a "Y" in the suffix represents a "Significant/Yellow" condition 1
2  In entry ID, Situations[1]=1
3  In entry ID, Situations[THIS]=Situations[PREM]+1
4

*Figure 6D-1*

Recommandation Codes

You Have 466

| Code 8 | 464 Reason for this State | Code 1 | Code 2 | Code 3 | Code 4 | Code 5 | Code 6 | 468 Entry ID |
|---|---|---|---|---|---|---|---|---|
| | 1101 | | | | | | | |
| | 2000 | | | | | | | |
| | 1349 | | | | | | | |
| | 1449 | | | | | | | |
| | 1383 | | | | | | | |
| | 1100 | | | | | | | |
| | 1483 | | | | | | | |
| | 1483 | | | | | | | |
| | 1100 | | | | | | | |
| | 1100 | | | | | | | |
| | 1371 | | | | | | | |
| | 1471 | | | | | | | |
| | 1100 | | | | | | | |
| | 1100 | | | | | | | |
| | 1375 | | | | | | | |
| | 1475 | | | | | | | |
| | 1100 | | | | | | | |
| | 1100 | | | | | | | |
| | 1372 | | | | | | | |
| | 1472 | | | | | | | |
| | 1112 | 10201 | 10204 | 10204 | 10208 | 10208 | 10207 | |
| | 1112 | 10201 | 10204 | 10203 | 10208 | 10207 | | |
| | 1112 | 10201 | 10203 | 10203 | 10207 | | | |
| | 1112 | 10201 | 10203 | 10208 | | | | |
| | 1112 | 10201 | 10208 | 10207 | 10204 | | | |
| | 1112 | 10201 | 10207 | 10208 | | | | |
| | 1112 | 10201 | 10202 | 10207 | 10207 | | | |
| | 1112 | 10201 | 10202 | 10208 | | | | |
| | 1112 | 10201 | 10202 | 10207 | 10207 | | | |
| | 1112 | 10201 | 10202 | 10207 | | | | |
| | 1112 | 10201 | 10207 | | | | | |
| | 1112 | 10201 | 10204 | 10205 | 10206 | 10208 | | |
| | 1112 | 10201 | 10204 | 10205 | 10206 | | | |
| | 1112 | 10201 | 10203 | 10208 | | | | |
| | 1112 | 10201 | 10203 | | | | | |
| | 1112 | 10201 | 10208 | 10204 | | | | |
| | 1112 | 10201 | 10204 | | | | | |
| | 1112 | 10201 | 10202 | 10208 | | | | |
| | 1112 | 10201 | 10202 | | | | | |
| | 1112 | 10201 | 10202 | 10208 | | | | |
| | 1112 | 10201 | 10202 | | | | | |
| | 1112 | 10201 | 10208 | | | | | |
| | 1112 | 10201 | | | | | | |

THE NOTES ANALYZER - [D_GD_020_-121-124IMP]

File  Edit  Create  View  Worksheet  Tool  Window  Help

Profile Combined\Rec Formula DPU\ Rec Formula Disk Rec Formula Memory\ Rec Formula Server Response\ Result Mail\ Formula Doc

470 / 472

| | | | | Is Component Enabled | | | | | | |
|---|---|---|---|---|---|---|---|---|---|---|
| | e CPU Utilization | e Mail Delivery | e Memory | e Server Respo | e Disk Utilization | e Network | e NRPC Name | e HTTP Respo | e LDAP Respo | e IMAP Respo |
| Placeholder | 0 | 0 | 0 | 0 | 0 | 0 | 0 | 0 | 0 | 0 |
| Cobb/IrisTS | 1 | 0 | 1 | 0 | 1 | 0 | 0 | 0 | 0 | 0 |
| Houston/Iris | 1 | 1 | 1 | 1 | 1 | 0 | 0 | 0 | 0 | 0 |
| Clapton/Iris | 0 | 0 | 0 | 0 | 0 | 0 | 1 | 0 | 0 | 0 |
| Aaron/IrisTS | 1 | 0 | 1 | 1 | 1 | 1 | 1 | 0 | 0 | 0 |
| Wrangle/UNIX/Notes | 1 | 0 | 1 | 1 | 1 | 1 | 1 | 0 | 0 | 0 |
| Frog/Iris | 0 | 0 | 0 | 0 | 0 | 0 | 1 | 0 | 0 | 0 |
| Eraser/UNIX/Notes | 0 | 0 | 0 | 0 | 0 | 0 | 1 | 0 | 0 | 0 |
| bhsurfers.Iris.com/Iris | 0 | 0 | 0 | 0 | 0 | 0 | 1 | 0 | 0 | 0 |
| Jethro/Iris | 1 | 0 | 1 | 0 | 1 | 1 | 1 | 0 | 0 | 0 |
| Twister/UNIX/Notes | 1 | 0 | 0 | 1 | 1 | 1 | 1 | 0 | 0 | 0 |
| 4bits/IrisTS | 1 | 0 | 1 | 0 | 1 | 1 | 1 | 0 | 0 | 0 |

Situations

| 13 | | | | | | | | | | |
| 14 | Overall Rating = Profile - Combined State Code Final | | | | | | | | | |
| Ariel | 9 | General | | | C:\NOTESR6\DATA | | | | | |

*Figure 7A-1*

Host & Server Doc\

Key Group | Component Idicies

| Overall Rating | CPU Utilization | Mail Delivery Latency | Memory Utilization | Server Response | Disk Utilization | Network Utilization | NRPC Name Lookup | HTTP Response | LDAP Response | IMAP Response |
|---|---|---|---|---|---|---|---|---|---|---|
| 0 | 0 | 0 | 0 | 0 | 0 | 0 | 0 | 0 | 0 | 0 |
| 1 | 1 | 0 | 1 | 0 | 1 | 0 | 0 | 0 | 0 | 0 |
| 3 | 1 | 3 | 1 | 0 | 1 | 0 | 0 | 0 | 0 | 0 |
| 2 | 0 | 0 | 0 | 0 | 0 | 0 | 2 | 0 | 0 | 0 |
| 1 | 1 | 0 | 1 | 0 | 1 | 1 | 1 | 0 | 0 | 0 |
| 1 | 1 | 0 | 1 | 0 | 1 | 1 | 1 | 0 | 0 | 0 |
| 2 | 1 | 0 | 2 | 0 | 0 | 0 | 1 | 0 | 0 | 0 |
| 1 | 0 | 0 | 0 | 0 | 0 | 0 | 1 | 0 | 0 | 0 |
| 1 | 0 | 0 | 0 | 0 | 0 | 0 | 1 | 0 | 0 | 0 |
| 3 | 1 | 0 | 3 | 0 | 1 | 1 | 1 | 0 | 0 | 0 |
| 1 | 1 | 0 | 1 | 0 | 1 | 1 | 1 | 0 | 0 | 0 |

FROM FIG. 7A-1

THE NOTES ANALYZER - [D_GD_020_-121-124IMP]
File  Edit  Create  View  Worksheet  Tool  Window  Help
Profile Combined\Rec Formula DPU\ Rec Formula Disk Rec Formula Memory\ Rec Formula Server Response\ Result Mail\

470 / 472

| | \multicolumn{5}{c}{Server Task States} | | | | |
|---|---|---|---|---|---|---|---|---|---|
| | DB Server | HTTP Web Server | IMAP Mail Server | LDAP Server | Router | 08 Type | Need mail,box | Need Delv Threads | Need Xfer Threads |
| Placeholder | | | | | | 0 | 0 | Unknown | Unknown |
| Cobb/IrisTS | | | | | | 1 | 0 | Unknown | Unknown |
| Houston/Iris | | | | | | 6 | Yes | Unknown | Unknown |
| Clapton/Iris | | | | | | 1 | 0 | No | No |
| Aaron/IrisTS | | | | | | 1 | 0 | No | No |
| Wrangle/UNIX/Notes | | | | | | 4 | 0 | No | No |
| Frog/Iris | | | | | | 2 | 0 | No | No |
| Eraser/UNIX/Notes | | | | | | 3 | 0 | No | No |
| bhsurfers.Iris.com/Iris | | | | | | 2 | 0 | No | No |
| Jethro/Iris | | | | | | 3 | 0 | No | No |
| Twister/UNIX/Notes | | | | | | 4 | 0 | No | No |
| 4bits/IrisTS | | | | | | 2 | 0 | No | No |

Situations
| 13 | | | | | | | | | |
| 14 | Overall Rating = Profile - Combined State Code Final | | | | | | | | |
| Ariel | 9 | General | | | | | C:\NOTESR6\DATA | | | |

*Figure 7B-1*

Formula Doc Host & Server Doc

Key Group

Recommendations Minor Blends – 478

| Mail WaitDNS | Need NumSpindies | Busiest Task | Buffe Pool Status | Db Cache Status | Add Memory | High Paging | Add Worker Threads | Add CPU | High CPU Queue |
|---|---|---|---|---|---|---|---|---|---|
| | | | | | | | | | |
| | | Yes | | | | 0 | | | |
| | | Yes | | | | 0 | | | |
| | | | | | | 0 | | | |
| | | | | High | Yes | Yes | | | |
| | | | | | | 0 | | | |
| | | | | | | 0 | | | |
| | | | | High | | Yes | | | |
| | | | | | | 0 | | | |
| | | | | | | 0 | | | |
| | | | | | | 0 | | | |

*Figure 7B-2*

FROM FIG. 7B-1

TO FIG. 7C-2

THE NOTES ANALYZER - [D_GD_020_-121-124IMP]
File  Edit  Create  View  Worksheet  Tool  Window  Help
Profile Combined\Rec Formula DPU\Rec Formula Disk Rec Formula Memory\ Rec Formula Server Response\ Result Mail\

478

470

| | Too Many Users | Add HTTP Threads | HTTP Log | LDAP from Q08 | HTTP from Q08 | Disk Metric | Add Network Bandwidth | High Network Collision | Over 100%Util Network | Move View Rebuild Dir |
|---|---|---|---|---|---|---|---|---|---|---|
| | | | | Key Group | | | | | | |
| | | | | Recommendation Minor Blends | | | | | | |
| Placeholder | | | | | | | | | | Yes |
| Cobb/IrisTS | Yes | | | 1 | 1 | | | | | Yes |
| Houston/Iris | Yes | | | | | | | | | Yes |
| Clapton/Iris | Yes | | | 1 | 0 | | | | | Yes |
| Aaron/IrisTS | | | | | | | | | | Yes |
| Wrangle/UNIX/Notes | | | | | 0 | | | | | Yes |
| Frog/Iris | | | | 0 | 0 | | | | | Yes |
| Eraser/UNIX/Notes | | | | | | | | | | Yes |
| bhsurfers.Iris.com/Iris | | | | | 0 | | | | | Yes |
| Jethro/Iris | | | | | | | | | | Yes |
| Twister/UNIX/Notes | | | | | | | | | | Yes |
| 4bits/IrisTS | | | | | 0 | | | | | Yes |

Situations
13
14  Overall Rating = Profile  - Combined  State  Code  Final
 9 | General |                | C:\NOTESR61DATA
Ariel

*Figure 7C-1*

THE NOTES ANALYZER - [D_GD_020-121-124IMP]
File  Edit  Create  View  Worksheet  Tool  Window  Help
Profile Combined\Rec Formula DPI\ Rec Formula Disk Rec Formula Memory\ Rec Formula Server Response\ Result Mail\ Formula Doc Host & Server Doc\

TO FIG. 7D-2

| 470 / 482 | | | Long Term Codes | | | | | | Recommendation Codes | | You Have Codes - 486 | | | | |
|---|---|---|---|---|---|---|---|---|---|---|---|---|---|---|---|
| | Code 3 | Code 4 | Code 5 | Code 6 | Code 7 | Code 8 | Reason Code | Primary Component | Code 1 | Code 2 | Code 3 | Code 4 | Code 5 |
| Placeholder | | | | | | | 1101 | -1 | | | | | |
| Cobb/IrisTS | | | | | | | 1102 | -1 | | | | | |
| Houston/Iris | | | | | | | 1115 | 6 | 10101 | 10104 | | | |
| Clapton/Iris | | | | | | | 1102 | -1 | | | | | |
| Aaron/IrisTS | | | | | | | 1102 | -1 | | | | | |
| Wrangle/UNIX/Notes | | | | | | | 1102 | -1 | | | | | |
| Frog/Iris | 201 | 208 | | | | | 1152 | -2 | 10201 | 10202 | 10207 | | |
| Eraser/UNIX/Notes | | | | | | | 1102 | -1 | | | | | |
| bhsurfers.Iris.com/Iris | | | | | | | 1102 | -1 | | | | | |
| Jethro/Iris | | | | | | | 1102 | -1 | | | | | |
| Twister/UNIX/Notes | 9001 | | | | | | 1102 | 2 | 10201 | 10204 | 10205 | 10206 | |
| 4bits/IrisTS | | | | | | | 1102 | -1 | | | | | |

Situations
| 13 |
| 14 | Overall Rating = Profile - Combined State Code Final |
| Ariel | 9 | General | C:\NOTESR6\DATA |

| Code 6 | Entry ID <br> 488 | Rec Value 1 | Rec Value 2 | Long Rec Value 1 | Long Rec Value 2 | You Have Value 1 <br> 490 |
|---|---|---|---|---|---|---|
| | | 0 | 0 | 0 | 0 | 0 |
| | | 0 | 0 | 0 | 0 | 0 |
| | | 0 | 0 | 0 | 0 | 0 |
| | | 0 | 0 | 0 | 0 | 0 |
| | | 0 | 0 | 0 | 0 | 0 |
| | | 0 | 0 | 0 | 0 | 0 |
| | | 0 | 0 | 0 | 0 | 512 |
| | | 0 | 0 | 0 | 0 | 0 |
| | | 0 | 0 | 0 | 0 | 0 |
| | | | | | 0 | 4096 |
| | | | | | | 0 |

Short Vals | Rec Values | Long Vals | You Have

FROM FIG. 7D1

TO FIG. 7E-2

THE NOTES ANALYZER - [D_GD_020_-121-124IMP]
File  Edit  Create  View  Worksheet  Tool  Window  Help
Profile Combined\Rec Formula DPU\ Rec Formula Disk Rec Formula Memory\ Rec Formula Server Response\ Result Mail\

490

470

| | You Have Values | | | | | | | | Too many mail boxes | Too many HTTP Threads |
|---|---|---|---|---|---|---|---|---|---|---|
| | You Have Value 2 | You Have Value 3 | You Have Value 4 | You Have Value 5 | You Have Value 6 | ab Overall Rating | ab OS Type | | | |
| Placeholder | 0 | 0 | 0 | 0 | 0 | 0 | 0 | | | |
| Cobb/IrisTS | 0 | 0 | 0 | 0 | 0 | 1 | 1 | | | |
| Houston/Iris | 115 | 0 | 0 | 0 | 0 | 3 | 6 | | | |
| Clapton/Iris | 0 | 0 | 0 | 0 | 0 | 2 | 1 | | | |
| Aaron/IrisTS | 0 | 0 | 0 | 0 | 0 | 1 | 1 | | | |
| Wrangle/UNIX/Notes | 0 | 0 | 0 | 0 | 0 | 1 | 4 | | | |
| Frog/Iris | 30.3 | 13.8 | 0 | 0 | 0 | 2 | 2 | | | |
| Eraser/UNIX/Notes | 0 | 0 | 0 | 0 | 0 | 1 | 3 | | | |
| bhsurfers.Iris.com/Iris | 0 | 0 | 0 | 0 | 0 | 1 | 2 | | | |
| Jethro/Iris | 0 | 0 | 0 | 0 | 0 | 1 | 3 | | | |
| Twister/UNIX/Notes | 500 | 50 | 10 | 0 | 0 | 3 | 4 | | | |
| 4bits/IrisTS | 0 | 0 | 0 | 0 | 0 | 1 | 2 | | | |

Situations
| 13 | | | | | | | | | | |
| 14 | Overall Rating = Profile - Combined State Code Final | | | | | | | | | |
| Ariel | 9 | General | | | | C:\NOTESR6\DATA | | | | |

*Figure 7E-1*

Formula Doc Host & Server Doc\

Absurd Items – 492

Absurd Conditions

| High Buffer Pool | TransLog Disk | Exe Same AsData | Need Platform Stats | Need Diskperf | Need NetStats | Need Console Access | Need Directory Access | Absurd Co Code 1 |
|---|---|---|---|---|---|---|---|---|
|  | Yes |  |  |  |  |  |  |  |
|  | Yes | Yes |  |  |  |  |  |  |
|  | Yes |  |  |  |  |  |  |  |
|  | Yes | Yes | 6 |  |  |  |  |  |
|  | Yes | Yes |  |  | Yes |  |  |  |
|  | Yes | Yes |  | Yes |  |  |  |  |
|  | Yes | Yes | 6 |  |  |  |  |  |
|  | Yes | Yes | 6 |  | Yes |  |  |  |
|  | Yes | Yes |  |  |  |  |  |  |
|  | Yes | Yes |  |  |  |  |  |  |

FROM FIG. 7E-1

*Figure 7E-2*

| Health Monitoring | ☐ ○ Refresh View | | | |
|---|---|---|---|---|
| Server Name | Component Index | Rating | Value | Date |
| ○ Annie/Iris | | Critical | 100.0 | 05/032001 04:31 PM |
| ○ Clapton/Iris | | Critical | 100.0 | 05/032001 03:05 PM |
| | ○ CPU Utilization | Significant | 76.6 | |
| | ○ Disk Utilization | Critical | 100.0 | |
| | HTTP Response | Normal | 5.0 | |
| | ○ LDAP Response | Critical | 100.0 | |
| | ○ Mail Delivery Latency | Critical | 100.0 | |
| | Memory Utilization | Normal | 0.0 | |
| | NRPC Name Lookup | NoiNormal | 5.1 | |
| | ○ Server Response | Critical | 71.0 | |
| ○ Emily/Iris | | Significant | 60.7 | 05/032001 04:37 PM |
| Houston/Iris | | Normal | 9.5 | 05/032001 04:37 PM |
| REM/Iris | | Normal | 6.3 | 05/032001 04:37 PM |
| Davrunner/Iris | | Normal | 5.9 | 05/032001 04:37 PM |

☐ Health Reports
  ☐ Current Reports
  ☐ Historical Report
☐ Configuration
  ☐ Server Profiles
  ☐ Index Threshold

FIG. 8B

Server Health Information

Server Name:                    Clapton/Iris

Server Health Assessment Index:    100

Server Health Assessment Rating:   Critical

Short Term Suggestions o Disk: Increase the DbCache setting
o Disk: Disk utilization Appears to be extremely high. Pleas provide the number of disk spindles:
o Disk: Minimize Server Logging

Long Term Suggestions o Disk: Upgrade Disk
o Disk: Use the 'Trends' tool to determine how to arrange your Domino files
o Disk: Defragment your disk(s)
o Disk: Compact Notes Databases

*Figure 8C*

METHOD AND APPARATUS FOR GENERATING DIAGNOSTIC RECOMMENDATIONS FOR ENHANCING PROCESS PERFORMANCE

RELATED APPLICATIONS

This application is one of three related applications filed on an even date herewith and commonly assigned, the subject matters of which are incorporated herein by reference for all purposes, including the following:

U.S. patent application Ser. No. 10/135,557, entitled "METHOD AND APPARATUS FOR DISPLAYING DIAGNOSTIC RECOMMENDATIONS FOR MONITORED PROCESSES"; and U.S. patent application Ser. No. 10/135,598, entitled "SYSTEM FOR MONITORING PROCESS PERFORMANCE AND GENERATING DIAGNOSTIC RECOMMENDATIONS".

FIELD OF THE INVENTION

This invention relates, generally, to data processing systems and, more specifically, to a technique for monitoring and diagnosing problems in processes over a computer network.

BACKGROUND OF THE INVENTION

Data processing systems have been in ever-increasing use over the past half century. One challenge facing operators and system administrators of such systems is how to detect and diagnose performance problems with the system before such problems reach a critical stage and cause a system failure. Numerous patents have addressed the problem of performance monitoring of various components or processes within a computer system. Some disclose processes of taking affirmative actions, such as band-width throttling, to adjust the resources of a system. For example, U.S. Pat. No. 5,732,240 discloses a technique for real-time adjustment of cache size in a computer system. However, few, if any, attempts have been made to diagnose the status of a process or system and make recommendations to a system administrator on how such problems may be resolved bases on the current health thereof. This is particularly true with more sophisticated processes such as server processes coupled to a computer network.

One of the impediments to designers of such systems has been the inability to convert the large amount of data relating to the status of a system into a meaningful recommendation which accurately identifies the source of a problem. Accordingly, a need exists for a technique in which data representing the status of a system can be analyzed and a recommendation generated for resolving new problems reflected in the data.

In addition, a further impediment to designers of diagnostic systems is the need to compensate for differences in system resources and platform configurations. For example, the hardware configuration and operating system performance have a direct influence on the performance of a server application, particularly with resource considerations such as available memory, processor speed, and network interface bandwidth. In addition, other dynamic factors may influence the performance of a process, such as the number of other processes simultaneously executing on the same system. Accordingly, a need exists for a technique in which performance criteria may be meaningfully applied to a plurality of processes executing on different platforms and in different load environments. A further need exists for a technique both compensates for such differences and can generate accurate diagnostic recommendations based on the disparate data collected among a plurality of processes.

In addition, once data has been collected about the status of a plurality of different processes it is often difficult to display such data in a format that allows a system administrator to easily track the status of a plurality of monitored processes and to understand any accompanying diagnostic recommendations. Accordingly, a further need exists for a technique in which status data and diagnostic recommendations for a plurality of different processes are displayed in a format that allows a system administrator to easily understand.

SUMMARY OF THE INVENTION

A diagnostic system according to the present invention monitors the performance health of other processes over a computer network by collecting status and configuration data, analyzing the data and providing diagnostic recommendations, when necessary. The diagnostic system includes a collector module, an analyzer module and an administration client module. The collector module collects statistical data and configuration data from each monitored process and populates a plurality of source data tables or worksheets. The values of the source data within these tables are processed by the analyzer module, including component algorithms, which generate a plurality of individual component indexes, each associated with a specific aspect of the processes performance. The component indexes are then weighted to form a composite index reflecting the overall health of the monitored process. If one or more of the index values exceed a predefined threshold, the indexes and configuration data are provided to an overall assessment table which identifies the process state situation which is true and generates one or more diagnostic recommendations, the output of which is stored in memory and is directly accessible to the administration client module. The administration client module enables the display, upon user query, of any of the source data, configuration data, component and composite indexes, and recommendations in a variety of different formats as well as searching of the same using any number of specific queries.

According to one aspect of the present invention, in a computer system operatively coupled to at least one other computer system over a computer network, a method diagnosing the source of the other computer comprises: (A) obtaining source data from the monitored computer system, the source data defining configuration settings and current values for a plurality of performance parameters of the monitored computer system; (B) deriving one or more indices from the source data, each index having a value within a predefined range of values and associated with a performance parameter of the monitored computer system; (C) using the value of the at least one index and at least a portion of the source data to identify one of a plurality of states as true, selected of the states having a diagnostic recommendation associated therewith; and (D) providing access to the diagnostic recommendation associated with the identified state. In one embodiment, the method of deriving one or more indices from the source data comprises deriving a plurality of component indices from the source data; and deriving a composite index from the plurality of component indices; and using the composite index as a reference to a compilation of diagnostic recommendations.

According to a second aspect of the present invention, a computer program product for use with a computer system operatively coupled to at least one other computer system over a computer network, comprise a computer useable medium having embodied therein program code comprising: (A) program code for obtaining source data from the monitored computer system, the source data defining a current value for a plurality of performance parameters of the monitored computer system; (B) program code for deriving one or more indices from the source data, each index having a value within a predefined range of values and associated with a performance parameter of the monitored computer system; (C) program code for using the value of the at least one index and at least a portion of the source data to identify one of a plurality of states as true, selected of the states having a diagnostic recommendation associated therewith; (D) program code for providing access to the diagnostic recommendations associated with an identified state.

According to a third aspect of the present invention, an apparatus for use with a computer system operatively coupled to at least one other computer system over a computer network comprises: (A) program logic for obtaining source data from the monitored computer system, the source data defining a current value for a plurality of performance parameters associated with the monitored computer system; (B) program logic for deriving one or more indices from the source data; (C) a memory for storing a plurality of process state situations entries, selected of the state situation entries having a diagnostic recommendation associated therewith; (D) program logic for using the value of the at least one index and at least a portion of the source data to identify one of a plurality of state situations as true; and (E) program logic for providing access to the diagnostic recommendations associated with an identified state situation. In one embodiment, the plurality of tables comprises a configuration truth table and a diagnostic recommendations table.

According to a fourth aspect of the present invention, a memory for storing data to be processed by a data processing system including an apparatus for monitoring and analyzing the performance of a process operatively coupled to a data processing system, the memory comprises a data structure stored in the memory and usable to identify recommended diagnostic actions for affecting the performance of a process, the data structure comprising: (a) identification data identifying one of a plurality of processes monitored by the data processing system, and (b) a plurality of process state situations associated with a monitored process identified by the identification data, each process state situations having associated therewith: (i) an index having a value within a predefined range of values and associated with a performance parameter of the monitored process identified by the identification data, (ii) configuration data identifying a configuration parameter of the monitored process identified by the identification data, and (iii) recommendation data identifying at least one recommended to affect performance of a parameter of the monitored process identified by the identification data.

According to a fifth aspect of the present invention, memory for storing data to be processed by a data processing system including an apparatus for monitoring and analyzing the performance of a process operatively coupled to a data processing system, the memory comprises a data structure stored in the memory and usable to identify the performance health of a process, the data structure comprising:

(a) identification data identifying one of a plurality of processes monitored by the data processing system, (b) a plurality component indexes, each of the component indexes having a value within a predefined range of values and associated with a performance different parameter of the monitored process identified by the identification data; and (c) a composite index derived from the plurality of component indices and indicates the overall performance health of the monitored process identified by the identification data. In one embodiment, the component indexes are associated with performance parameter of the monitored process selected from the group consisting of processor utilization, memory utilization, disk utilization, network utilization, mail delivery latency performance, address resolution performance, server response, HTTP response, LDAP response, and IMAP response.

BRIEF DESCRIPTION OF THE DRAWINGS

The above and further advantages of the invention may be better understood by referring to the following description in conjunction with the accompanying drawings in which:

Figure 6B-2:
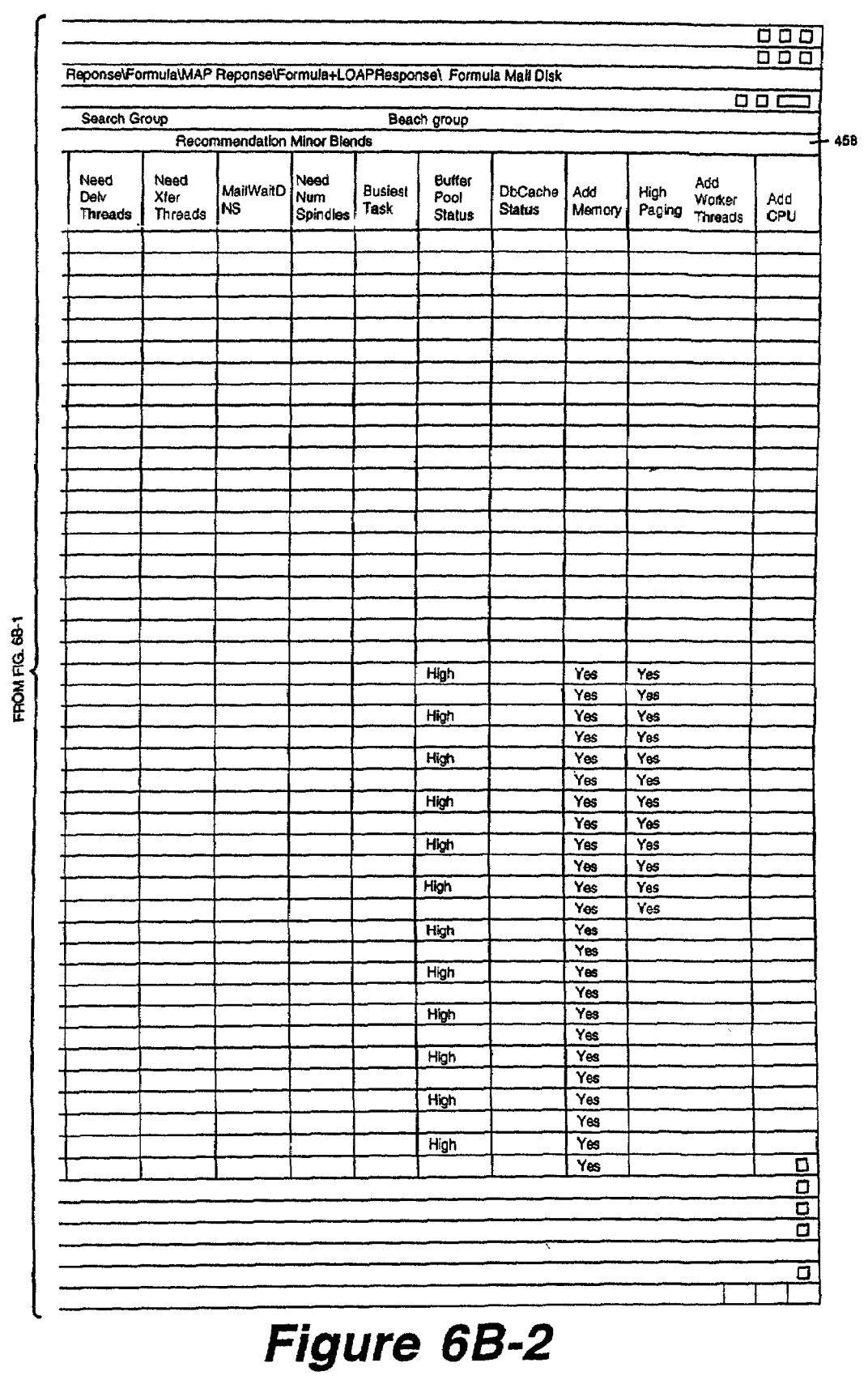

FIGS. 6A-D illustrates conceptually a configuration truth table in accordance with which the present invention;

FIGS. 7A-E illustrates conceptually a recommendation table in accordance with which the present invention;

FIGS. 8A-C illustrate conceptually various graphic user interfaces used to present data in accordance with which the present invention.

DETAILED DESCRIPTION

Figure 1:
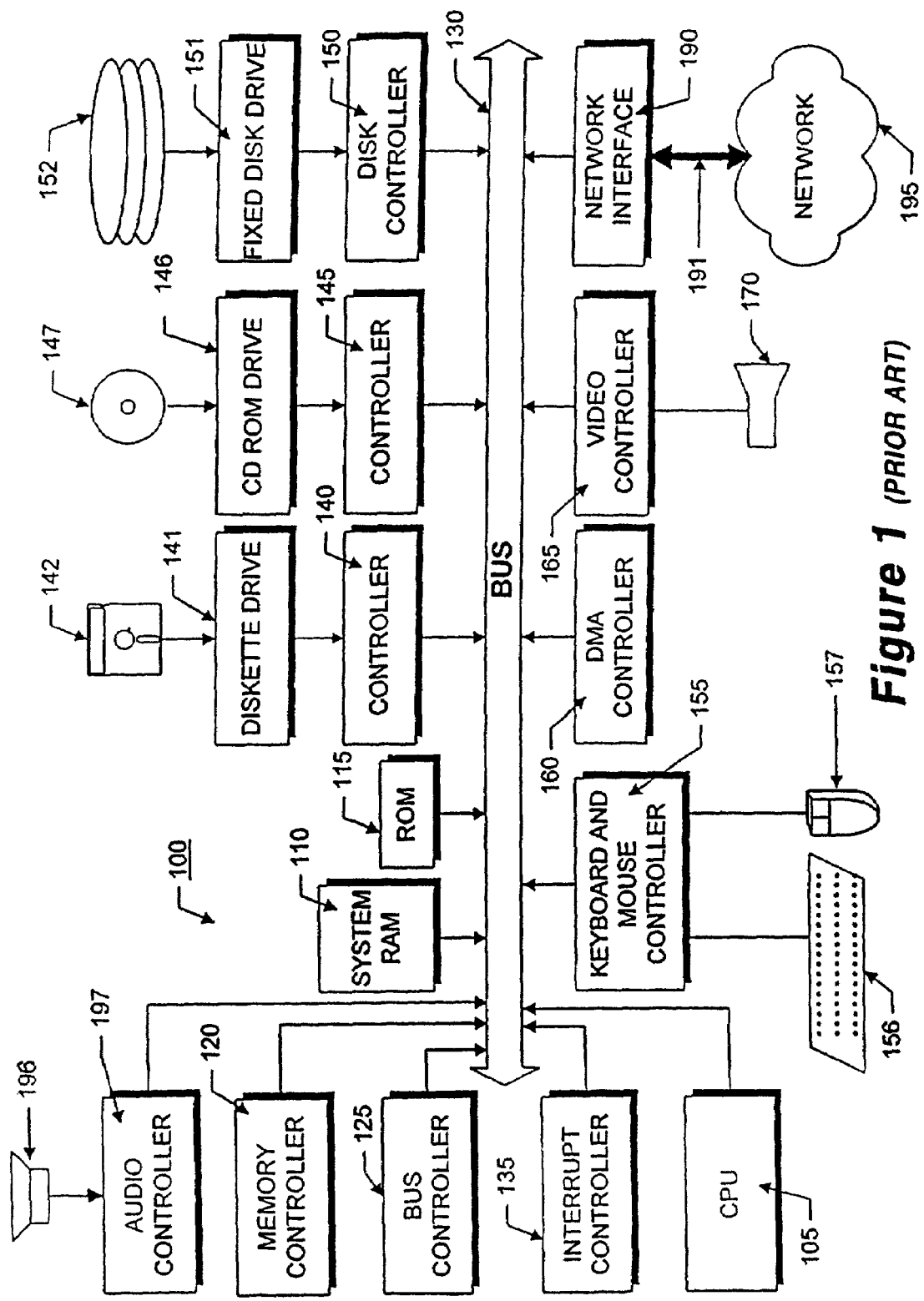
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DMA controller 160 is provided for performing direct memory access to system RAM 110. A visual display is generated by video controller 165 which controls video display 170. In the illustrative embodiment, the user interface of a computer system may comprise a video display and any accompanying graphic use interface presented thereon by an application or the operating system, in addition to or in combination with any keyboard, pointing device, joystick, voice recognition system, speakers, microphone or any other mechanism through which the user may interact with the computer system.

Computer system 100 also includes a communications adapter 190 which allows the system to be interconnected to a local area network (LAN) or a wide area network (WAN), schematically illustrated by bus 191 and network 195.

Computer system 100 is generally controlled and coordinated by operating system software, such the OS/2® operating system, available from International Business Machines Corporation, Armonk, N.Y., or Windows® operating system, available from Microsoft Corporation, Redmond Wash. The operating system controls allocation of system resources and performs tasks such as process scheduling, memory management, and networking and I/O services, among other things. In particular, an operating system resident in system memory and running on CPU 105 coordinates the operation of the other elements of computer system 100. The present invention may be implemented with any number of commercially available operating systems including AIX, UNIX and LINUX, DOS, etc. One or more applications 220 such as Lotus Notes or Lotus Sametime, both commercially available from International Business Machines Corp., may execute under control of the operating system. If operating system 210 is a true multitasking operating system, multiple applications may execute simultaneously.

In the illustrative embodiment, the present invention may be implemented using object-oriented technology and an operating system which supports execution of object-oriented programs. For example, the inventive code module may be implemented using the C++ language or as well as other object-oriented standards, including the COM specification and OLE 2.0 specification for MicroSoft Corporation, Redmond, Wash., or, the Java programming environment from Sun Microsystems, Redwood, Calif.

In the illustrative embodiment, the elements of the system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

Network Environment

Figure 2:
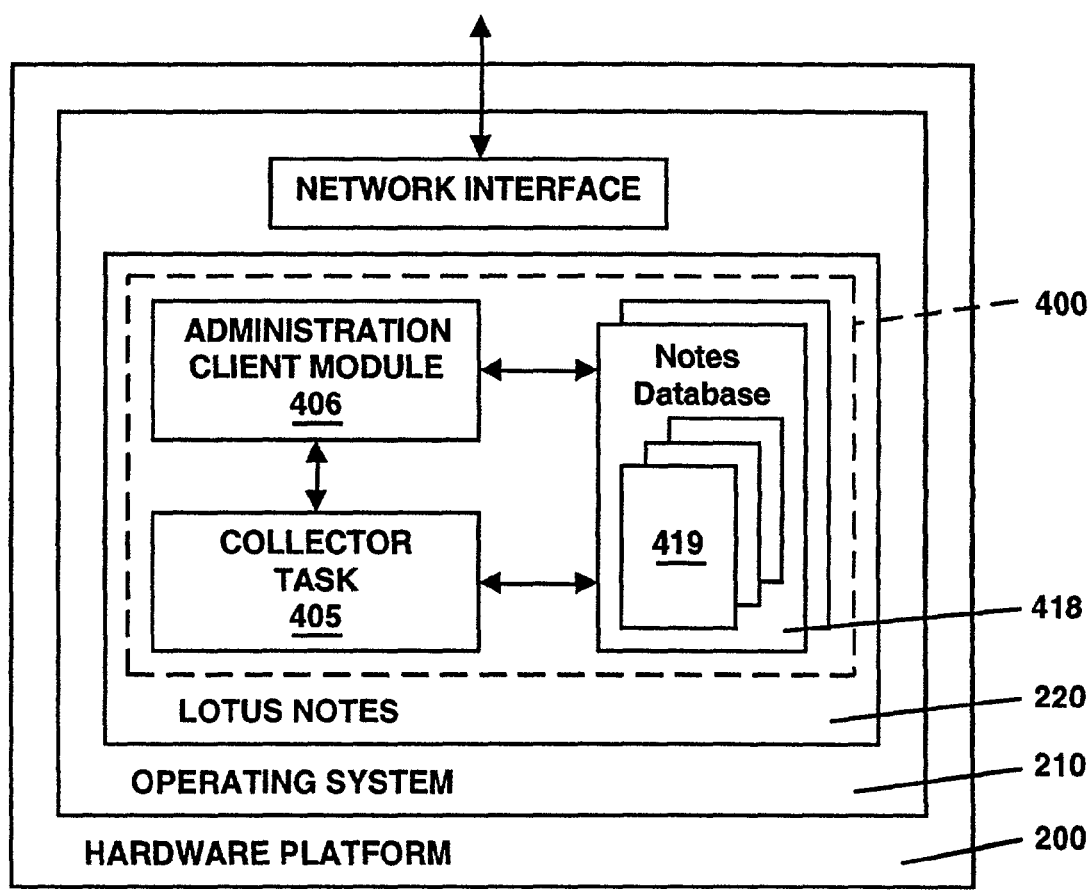
FIG. 2 illustrates conceptually the relationship between the components of the diagnostic system in which the present invention may be utilized.

FIG. 2 is illustrates conceptually the relationship between the components of the system in which the present invention may be utilized. The illustrative embodiment of the invention is implemented as part of Lotus Notes ®, commercially available from International Business Machines Corporation, Lotus Brand Software, Cambridge, Mass., however, it will be understood by those reasonably skilled in the arts that the inventive functionality may be integrated into other applications as well as the computer operating system.

International Business Machines Corporation had previously made an administrative client process available which was capable of collecting and presenting status and configuration data from Lotus Notes Domino applications, however no functionality for diagnosing problems or making recommendations to resolve such problems was included. To implement the functionality of the present invention, a diagnostic system 400, including an improved administrative client is implemented within the Lotus Notes Domino application and interacts with the existing functionality, routines and commands of Lotus Notes. As shown in FIG. 2, diagnostic system 400 is integrated into Lotus Notes application 220 and may execute under the control of operating system 210 which, in turn, executes within the hardware parameters of hardware platform 200, which may be similar to that described with reference to FIG. 1.

Monitored Processes

Figure 3:
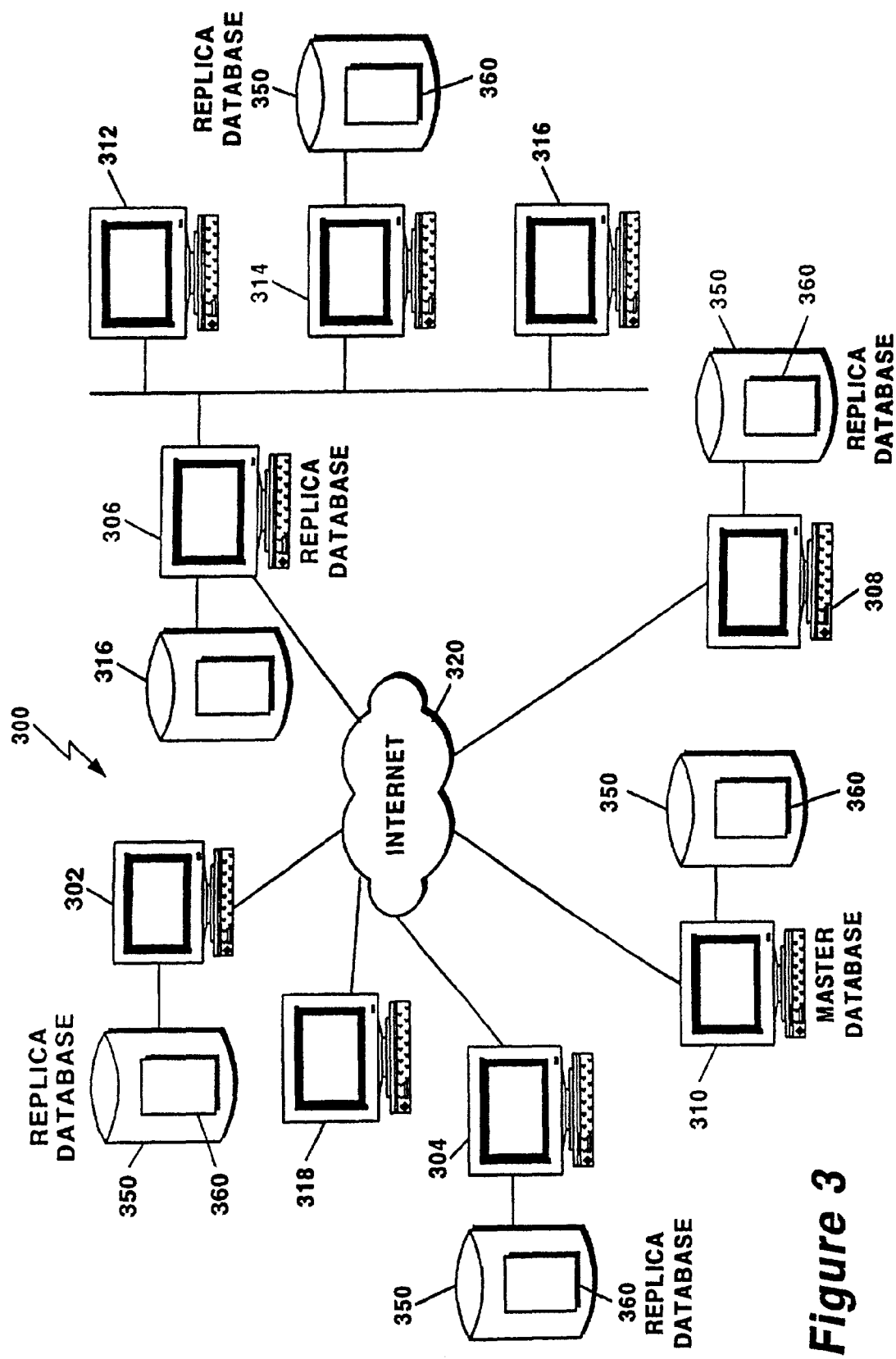
FIG. 3 illustrates conceptually a computer network environment in which the present invention may be utilized.

FIG. 3 illustrates a network environment in which the invention may be practiced, such environment being for exemplary purposes only and not to be considered limiting. Specifically, a packet-switched data network 300 comprises a servers 302-310, a plurality of Notes processes 310-316 and a global network topology 320, illustrated conceptually as a cloud. One or more of the elements coupled to global network topology 320 may be connected directly or through Internet service providers, such as America On Line, Microsoft Network, Compuserve, etc. As illustrated, one or more Notes process platforms may be located on a Local Area Network coupled to the Wide Area Network through one of the servers.

Servers 302-308 may be implemented as part of an all software application which executes on a computer architecture similar to that described with reference to FIG. 1. Any of the servers may interface with global network 320 over a dedicated connection, such as a T1, T2, or T3 connection. The Notes processes 312, 314, 316 and 318 may likewise be implemented as part of an all software application that run on a computer system similar to that described with reference to FIG. 1, or other architecture whether implemented as a personal computer or other data processing system.

In the illustrative embodiment, servers 302-310 are the monitored processes and may be implemented within the Lotus Notes Domino server application. A Domino server application is a collection of server applications and services, such as an HTTP server, a database server, an IMAP mail server, an LDAP server, and a router, which collectively may be viewed as a single server task that interacts with the existing functionality, routines or commands of Lotus Notes, most of which are publicly available. Each Domino server includes a server side statistics package 401, here the Domino statistics package, which is publicly documented with every version of a Domino server. This information includes performance and configuration data and is updated periodically. Such information resides in a database of the server, such as database 350.

In the illustrative implementation, the Domino servers 302-310 "push" data, i.e. transmit data from the server process being monitored to the administrator client 406. The data used to make the diagnostic analysis may be either pulled, i.e., received upon queries generated from the administrator server client 406 or pushed, i.e. transmitted from a server process being monitored to the administrative client 406, or a combination of both.

Diagnostic System

Figure 4:
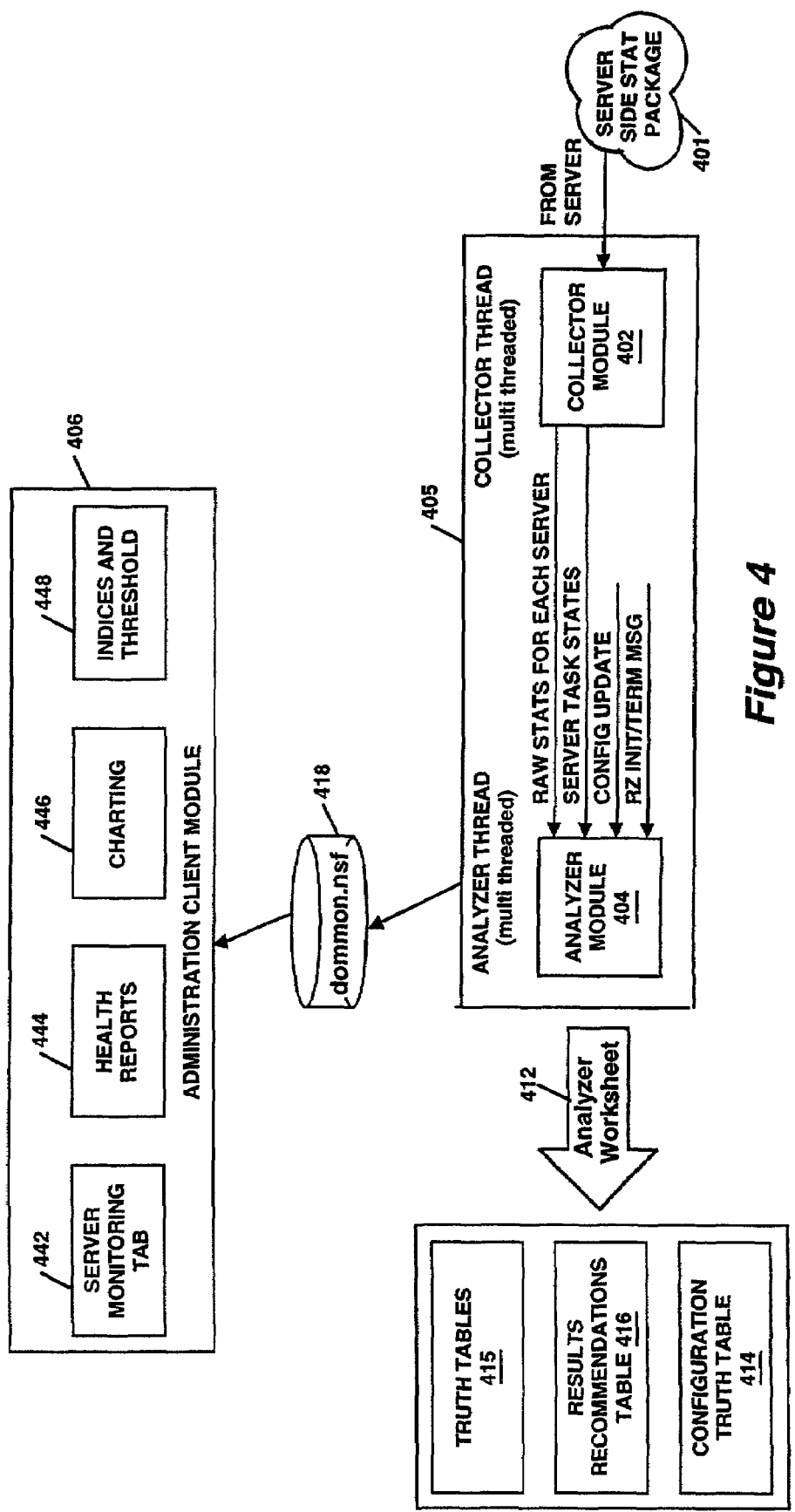
FIG. 4 illustrates conceptually the relationship between the components of the diagnostic system in which the present invention may be utilized.

FIG. 4 illustrates conceptually the components of the inventive diagnostic system 400. In the illustrative embodiment system 400 may be implemented with an all software application that comprises an administration client module 406 and a collector task 405. As explained hereafter in greater detail, administration client module 406 is user to initiate operation of collector task 405 which comprises collector module 402 and analyzer module 404. Collector module 402 is primarily responsible for the collection of source data from each of the monitored server processes. The analyzer module 404 applies the collected source data to a plurality of spread sheets, referred by to herein as worksheets 412 which, using various algorithms defined hereafter, generate component indexes and a composite index reflecting the overall performance health of a monitored process. The component and composite indexes, as well as certain configuration data, are used as indexes into configuration table recommendation tables. The administration client module 406 servers primarily to allow the source data, component and composite indexes and recommendations to be presented to a system administrator, along with other relevant data in a variety of different formats. Each of these modules is described below in greater detail.

Collector Module

The primary function of collector module 402 is to collect data from monitored server processes. The collector module 402 uses multiple threads to collect the statistic data from a plurality of different server processes simultaneously. The various types of statistical data are collected or may be collected with different frequencies. For example, information from the Notes.INI file on servers 302-310 may be transmitted directly to the analyzer module 404. Configuration information is pulled from a Domino directory on each of servers 302-310 to the analyzer module 404 at regular interval, e.g. once every four hours. Such configuration information may include comprise memory size, number of CPUs available on a platform, CPU/disk utilization, page faults, queue lengths, etc. Other run-time specific statistical data such as number of messages sent, etc., may be pulled from the Domino statistics package 401 on each server 302-310 at regular intervals, e.g. once a minute. In the illustrative embodiment, the administration client module 406 requests multiple values from a process and then discards any values which are not relevant. In the illustrative embodiment, the collector module pulls statistical data and configuration information from each monitored server process. However, the data used to make the diagnostic analysis may be either pulled, i.e., received upon queries generated from the administrator client or pushed, i.e. transmitted from a process being monitored to the administrator client. In the illustrative embodiment of the present invention, there is specific C code may be used to prepares incoming data from the collector module 402 for the Analyzer Module APIs and passes result data from the Analyzer module APIs to the database 418.

In an alternative embodiment, the collector task further comprises a parser module which parses the statistical data, compares the parsed values to predefined threshold values, and, issues alarms if certain values are beyond a predefined threshold. In addition the collector module writes the data, as received, to database 418.

Analyzer Module

The Analyzer Module 402 includes algorithms which may be written in the C++ programming language that generate from the source data one or more recommendations relating to the health of a monitored process. Specifically, Analyzer Module 402 fetches configuration data, such as server list from the NAB, diagnostic threshold values, etc., and receives incoming data, such as server statistics, task states, etc. Analyzer Module 402 further fetches other input data such as notes.ini settings. Given all or a subset of the above data, referred to herein as "source data", analyzer module 402 populates a plurality of worksheets 412 which process the source data values, as described hereafter. Analyzer Module 402 writes the results of the evaluations to memory, e.g. the admin client statistics package, and writes other results to Notes documents 419, which reside in Notes databases, dommon.nsf database 418, as necessary.

Analyzer Module 404 runs as a multithreaded task within the collector tack 405. A trigger may be set by default or user configuration to deliver Domino raw statistics from Collector Module 402 to the Analyzer Module 404. Analyzer Module 404 uses algorithms associated with one or more of the worksheets 412, as described hereafter, to calculate the component indexes. These blended statistics may be stored along with the raw Domino statistics in database 418. Accordingly, the blended statistics are treated like any other Domino statistics and can take advantage of an events and notifications database as well as the user interfaces and features for displaying statistics within the administration client module 406.

In the illustrative embodiment, the server health assessment and recommendation logic for system 400 is defined in an .imp file of the Analyzer module 404. The file, called a model, is a collection of worksheets 412, truth tables, look-up tables, queries and reverse queries. The worksheets 412 comprise a plurality of spreadsheets and associated formulas used to compute the component indexes. The queries facilitate input mapping from source data stores compiled by the collector module 402, as well as other inputs from dommon.nsf. The reverse queries facilitate output mapping from worksheets within the analyzer module 404 to destination data stores, such as administration client status database 418.

Component Indexes

Since no one statistic predicts the health of a server process, system 400 uses process and operating system statistics to help predict the health of a particular process. System 400 generates a composite index or health profile of each monitored process 302-310 from a plurality of "blended" statistics or component indexes, each having a value within a predetermined range, e.g. between 0 and 100. The indexes are created by applying a plurality of algorithms or rules to the raw statistics from a server process and its respective operating system, as well as configuration information about those processes. The resulting component indexes are weighted using an algorithm to determine the importance of each statistic as a part of an overall composite index used to indicate the health of the server process. The component and general indexes are stored in client status database 418 and in a admin client statistics package each time a new time interval of data is logged. It is contemplated in the present invention that system administrators may configure how often data is captured and new indexes are created for the respective monitored processes.

There are a plurality of component indices that make up the health profile of a monitored process, each of which may have one or more algorithms associated with the respective index, as described hereafter in prose and pseudocode.

1. CPU Utilization—A blended statistic reflects the overall CPU utilization of the server process. The CPU Utilization component appears in the a server health monitor report if the Domino version 5.0.2 or greater, platform statistics are supported and enabled on the server process and the server's operating system is Windows NT/2000, Solaris, AIX or OS/400. The CPU Utilization component index takes into account both percent processor utilization and the CPU Queue length. Such metric is provided in the Domino Platform statistics. For Domino Release 5.x, the percent processor utilization statistic is named Plafform.System.TotalUtil. For Domino Release 6, the statistic name was changed to Platform.System.PctCombinedCpuUtil.

Define:
CPU Total Util=Platform.System.TotalUtil. (for R5.x) or Platform.System.PctCombinedCpuUtil (for R6)

The Server health component thresholds are the values at which a component reading is considered Warning (Yellow) and Critical (Red). The CPU Utilization thresholds, are initially set to platform-specific defaults, but are modifiable (per-platform) by the Administrator. For the purpose of this document, let us identify the percent CPU utilization thresholds as YellowU and RedU. Sample threshold values are 75 and 85 (i.e. 75%<=Warning<85%, and Critical>=85%). For UNIX platforms (Solaris and AIX) running Release 6, the system 400 also considers the Run Queue statistic. Note that the "CPUQueueLength" statistic is also provided on Win32 platforms, but its value is considered unreliable.

Define:

RunQueue=Platform.System.CPUQueueLength/Server.CPU.Count

The threshold values for CPU RunQueue are: YellowQ (Warning)=3, RedQ(Critical)=5. These values are based on the experience of running performance tests, such as the WebMail test described below, various Domino UNIX servers and examining Run Queue values as the load on the server is increased. In this case the CPU Run Queue metric primarily indicates a Warning condition, while the CPU % Utilization metric is unmistakably Critical.

In order to normalize this Run Queue value to a 0-100 based value that is compatible with the threshold settings for percent Processor Utilization, this metric undergoes a number of adjustments:

```
CPU RunQueue =
    RunQueue * YellowU/YellowQ
        if RunQueue <= YellowQ           GREEN
    YellowU + ((Red U − YellowU) * (RunQueue − YellowQ)/(RedQ −
YellowQ))
        if YellowQ < RunQueue < RedQ     YELLOW
    MIN(100, RedU + ((RunQueue − RedQ) * RedU)/RedQ
        if RunQueue > RedQ               RED
```

The table below lists the RunQueue ratings based on the formulas and thresholds defined above:

| RunQueue (per CPU) | CPU RunQueue |
|---|---|
| 0 | 0 |
| .5 | 12.5 |
| 1 | 25 |
| 1.5 | 37.5 |
| 2 | 50 |
| 2.5 | 62.5 |
| 3 | 75 |
| 3.5 | 77.5 |
| 4 | 80 |
| 4.5 | 82.5 |
| 5 | 85 |
| 5.5 | 93.5 |
| 6 | 100 |

The formula for CPU Utilization is defined as follows:
for Win32 Platforms:

CPU Util=CPU Total Util for UNIX Platforms:

CPU Util=MAX(CPU Total Util, CPU RunQueue)

The CPU utilization component should minimize the effect of a CPU data spike. One very high CPUreading should not by itself lead to a high overall CPU rating. One approach toward this objective is to use an average of a series of CPU util values. In general, tracking the most recent 'N' CPU Util readings, the formula is as follows:

CPU Utilization=Average of last 5 readings of CPU Util

Currently the system uses a hard-coded value of 5 readings. This value is configurable.

EXAMPLE

The most recent five Platform CPU Util are being used, and are: 25, 40, 20, 15, 90.

CPU Utilization=(25+40+20+15+90)/5=38.

If the CPU area is assigned a weighting of 20%, then the overall contribution of CPU to the blended statistic is:

38*20%=7.6

The Sliding Scale is a mechanism that is used to "exacerbate" a weighted reading when conditions warrant. The generalized sliding-scale formula for CPU Utilization is as follows:
Define: w=weighting
  tamber=amber trigger
  tred=red trigger

---

Sliding Scale CPU Utilization =
  w * CPU (if CPU < tamber)       GREEN
  (w * tamber) + ((100 − (w * tamber)) * (CPU − tamber))/(tred − tamber)
        (if tamber <= CPU <= tred)     AMBER
  100 (if CPU > tred)              RED

---

EXAMPLE w=20%=0.20, tamber=75, tred=85

---

Sliding Scale CPU Utilization =
  0.20 * CPU            (if CPU <= 75) GREEN
  As CPU from 0 to 75, Weighted CPU varies from 0 to 15
15 + (85 * (CPU − 75)/10)        (if 75 < CPU < 85) AMBER
  As CPU varies from 75 to 85, Weighted CPU varies from 15 to 100
100                (if CPU >= 85) RED

---

Exemplary Results:

| CPU | SlidingScale CPU |
| --- | --- |
| 25 | 0.2 * 25 = 5 |
| 50 | 0.2 * 50 = 10 |
| 70 | 0.2 * 70 = 14 |
| 75 | 0.2 * 75 = 15 |
| 77 | 15 + (85 * 2)/10 = 32 |
| 80 | 15 + (85 * 5)/10 = 57.5 |
| 83 | 15 + (85 * 8)/10 = 83 |
| 85 | 15 + (85 * 10)/10 = 100 |
| 90 | 100 |
| 100 | 100 |

2. Mail Delivery Latency—The mail delivery latency formula is based on the Mail.TotalPending, Mail.Waiting, Mail.Dead, and Mail.Hold statistics of a Domino server process. Mail.Waiting is dependent on the router task; if the router is not running, then Mail.Waiting is not updated. Mail.TotalPending is updated by the server task to reflect the current number of messages that are pending delivery. Note: As points of information, Mail.Dead represents mail that cannot be delivered and could not be returned to the sender. Mail.Hold is mail that is being held pending delivery to an external site. The Mail.TotalPending count includes both Dead and Held mail, while the Mail.Waiting figure does not include these items. The absence of Pending/Waiting mail, i.e. Mail.TotalPending=0, Mail.Waiting=0) is an indication of a healthy mail router. For the purpose of this disclosure define:

MailToDo=MAX(Mail.Waiting, Mail.TotalPending—Mail.Dead—Mail.Hold)

The Mail Delivery Latency algorithm should take into account situations where a backlog of a few mail items is a normal condition. Therefore, a threshold of 20 "ToDo" messages has been established, below which the health is considered normal. Furthermore, a single aberrant "ToDo" value should not by itself cause a critical condition. Therefore, the algorithm is based on a series of MailToDo readings, and evaluation of the differences in readings. An average of a series of "deltas" or "differences" in MailToDo should return a result that diminishes the effect of an individual data spike.

"Average Delta" Calculation:
  Given N=the number of most recent readings for MailToDo
  M=sampling interval (in minutes),
  Calculate the N−1 "Delta Mail.Waiting" values, and define a "per-minute" average change in MailToDo as follows:

AverageDeltaMailToDo=Sum of "Delta Mail ToDos"/((M)*(N−1))

(if the Average<0, set it=0)
This formula happens to reduce to the simpler form:

AvgDeltaMailToDo=(MailToDo[newest]−Mail.ToDo[oldest])/(M*(N−1))

The Mail Delivery Latency formula can now be defined as:
  MailDeliveryLatency=
    0 if MailToDo<20 OR AverageDeltaMailToDo<=0
    50*AvgDeltaMailToDo
      if 0<AverageDeltaMailToDo<=2
    97 if AverageDeltaMailToDo>=1
    98 if the HTTP server task is running, but is reporting fatal errors Example 1

For MailToDo values (oldest to newest) of 25, 20, 30, 20, 25, 20, and sampling interval=1 minute, then
  MailToDo[newest]=20
  MailToDo[oldest]=25
  M=sampling interval=1
  N=sample size=6
  AvgDeltaMailToDo=(20−25)/(1*5)=−1, which is <=0
  Therefore, MailDeliveryLatency=0

Example 2

For MailToDo values (oldest to newest) of 40, 50, 45, 38, 41, 44, and sampling interval=1 minute, then
  MailToDo[newest]=44
  MailToDo[oldest]=40
  M=sampling interval=1

N=sample size=6
AvgDeltaMailToDo=(44−40)/(1*5)=0.8
Therefore, MailDeliveryLatency=40

Example 3

For MailToDo values (oldest to newest) of 20, 35, 35, 55, 50, 75, and sampling interval=1 minute, then
MailToDo[newest]=75
MailToDo[oldest]=20
M=sampling interval=1
N=sample size=6
AvgDeltaMailToDo=(75−20)/(1*5)=11, which is >=2
Therefore, MailDeliveryLatency=100

If the Mail.TotalPending stat does not exist (e.g. for releases of Domino prior to version 5.0, then use Mail.Waiting.

The "AverageDeltaMailWaiting" value is affected by the interval between which Mail.Waiting is captured. If Mail.Wating is increasing, a narrow interval (e.g. 1 minute) would probably generate a smaller DeltaMailWating value, and hence a smaller Mail Delivery Latency value than a large interval (e.g. 15 minutes). One solution for this situation is to account for the data capture interval with a scaling factor (SF), so that if data is captured every 15 minutes, divide the scaling factor by 15, a 5 minute capture interval would result in a division by 5, etc.

If Mail.Waiting is increasing over time, the following are suggested actions:
1. Increase the number of mailboxes (mail.box files) via the Server's Domino Directory:
   Configurations->Router/SMTP->Basics->Number of mailboxes
2. Increase the number of Delivery and/or Transfer threads.
   Check whether the Router is using all of its allocated Delivery and/or Transfer Threads.
   Issue "Tell Router Status" status at the Domino console.
   Transfer Threads
      Max=Number of transfer threads allocated
      Total=Number of transfer threads currently in use
   Delivery Threads
      Max=Number of delivery threads allocated
      Total=Number of delivery threads currently in use If the router is being utilized on Delivery and/or Transfer threads, and the server has the available memory and CPU to accommodate additional threads, then it may be worth increasing the number of Router Delivery and/or Transfer Threads. These settings can be modified in the Server's Domino Directory by accessing:
   Configurations->Router/SMTP->Restrictions and Controls->Delivery Controls->Maximum Delivery Threads
   Configurations->Router/SMTP->Restrictions and Controls->Transfer Controls->Maximum Transfer Threads
However, if these thread settings are made arbitrarily high, excessive contention on the mailbox file(s) and therefore high resource utilization may result.

A sliding scale algorithm defines the conditions under which the designated weighting is applied to the statistic, as calculated by the formula defined above, and the conditions under which the weighting mechanism is abandoned in favor of another method to "escalate" the metric.
Define:
   w=weighting
   tamber=amber trigger
   tred=red trigger

```
Sliding Scale MailDeliveryLatency =
   w * MailDeliveryLatency
      if MailDeliveryLatency <= tamber HEALTHY
   (w * tamber) + ((97 − (w * tamber)) * (MailDeliveryLatency − tamber))/(tred − tamber)
      if tamber < MailDeliveryLatency < tred WARNING
   100    if MailDeliveryLatency >= tred CRITICAL
```

EXAMPLE w=10%, tamber=40, tred=60

```
Sliding Scale MailDeliveryLatency =
   0.10 * MailDeliveryLatency
      if MailDeliveryLatency <= 40 HEALTHY
   4 + 93 * (MailDeliveryLatency − 50)/50
      if 40 < MailDeliveryLatency < 60 WARNING
   97    if MailDeliveryLatency >= 100 CRITICAL
```

Exemplary Results:

| AvgDeltaMailWaiting | MailDeliveryLatency | Sliding-Scale |
|---|---|---|
| <=0 | 0 | 0 |
| 0.1 | 5 | 0.5 |
| 0.2 | 10 | 1.0 |
| 0.5 | 25 | 2.5 |
| 0.8 | 40 | 4 |
| 0.9 | 45 | 27.25 |
| 1.0 | 50 | 50.5 |
| 1.1 | 55 | 73.75 |
| 1.2 | 60 | 97 |
| 2.0 | 97 | 97 |

3. Memory Utilization—A blended statistic reflects the memory utilization of the server process. The Memory Utilization component index appears in the Health Report if the platform platform Statistics are enabled and the operating system is nay of Windows NT/2000, AS/400, Solaris, AIX. Note: For Solaris version 5.8, the Memory component may always equal zero because the Scan Rate metric used in Memory analysis appears to always equal zero. The statistics used to calculate the memory utilization component index:
   Amount of Free/Available Memory
      Platform.Memory.KBFree
      Platform.Memory.RAM.AvailMBytes
   Amount of Installed Memory
      Mem.PhysicalRAM
      Platform.Memory.RAM.TotalMBytes Note, for Win32 operating system platforms, the Memory Utilization component of the composite index is based on available physical memory. For the sake of simplicity, call the Free Memory statistic "RAM.Available" (in MB) and the Installed Memory stat "RAM.Total" (also in MB). For a system with RAM.Total>2 GB, the maximum usable amount of Memory is actually about 2.1 GB, in which case, the reported RAM.Usable is misleading. For example, a system with 8 GB RAM, and 1.9 GB used, will report RAM.Usable=8 GB−1.9 GB=6.1 GB, but on a small amount of the 6.1 GB (~200 MB) is really usable. So, if the reported RAM.Total>2.1 GB, the system adjusts RAM.Available as follows:

$$RAM.Available=2150-(RAM.Total-RAM.Available)).$$

| Memory Utilization Rating = | |
|---|---|
| 0 | if RAM.Available >= 100 MB |
| 100 - RAM.Available | if RAM.Available < 100 MB |

| Memory Utilization = | |
|---|---|
| 0 | if RAM.Usable >= 100 MB |
| 100 - RAM.Usable | if RAM.Usable < 100 MB |

Server health component thresholds are the values at which a component reading is considered Significant (Yellow) and Critical (Red). The Memory Utilization thresholds may be predefined. These values are initially set to platform-specific defaults, but are modifiable (per-platform) by the Administrator. For the purpose of this disclosure, let the Memory Utilization thresholds be defined as YellowU and RedU. Therefore, given threshold Memory Utilization values of 50 and 90, which translates to 50 MB available/usable and 10 MB available/usable, results in:

0 MB Usable<=Critical<10 MB Usable<=Warning<50 MB Usable

For Solaris, a more useful metric for Memory analysis may be the "Scan Rate", which s provided in the Domino Platform Statistics for Solaris under the name Platform.Memory.ScanRatePagesPerSec. The threshold values for Scan Rate are YellowS(Significant)=200, RedS(Critical)=400. These values are based on the experience of running performance tests,and examining Scan Rate values as the load on the server is increased.

In order to normalize the Scan Rate to a 0-100 based value that is compatible with the threshold settings for Memory Utilization, this metric undergoes a number of adjustments as follows:

| Memory Utilization = |
|---|
|    ScanRate * (YellowU/YellowS) |
|      if ScanRate <= YellowS (GREEN) |
|    YellowU + ((RedU − YellowU) * (ScanRate − YellowS)/ (RedS − YellowS)) |
|      if YellowS < Scan Rate < RedS (YELLOW) |
|    MIN(97, RedU + ((ScanRate − RedS) * RedU)/RedS |
|      if Scan Rate >= RedS (RED) |

Examplary Results:

| Scan Rate | Memory Utilization | Condition |
|---|---|---|
| 0 | 0 * (50/200) = 0 | Healthy |
| 100 | 100 * (50/200) = 25 | Healthy |
| 200 | 200 * (50/200) = 50 | Warning |
| 300 | 50 + (90 − 50) * (300 − 200)/(400 − 200) = 70 | Warning |
| 400 | min(97, 90 + (400 − 400) * 90/400) = 90 | Critical |
| 500 | min(97, 90 + (500 − 400) * 90/400) = 97 | Critical |

For the AIX operating system, a more useful metric for Memory analysis may be the ratio of "Scan Rate" to "PagesFreedRate", both of which are provided in the Rnext Domino Platform Statistics for AIX:

Platform.Memory.ScanRatePagesPerSec and Platform.Memory.
   PagesFreedRatePerSec.

For simplicity, this ratio is referred to as the "Scan Ratio". The threshold values for Scan Ratio are YellowS(Significant)=5, RedS(Critical)=9.

In order to normalize the Scan Ratio to 0-100 based value that is compatible with the threshold settings for Memory Utilization, this metric undergoes a number of adjustments:

| Memory Utilization = |
|---|
|    ScanRatio * (YellowU/YellowS) |
|      if ScanRatio <= YellowS (GREEN) |
|    YellowU + ((RedU − YellowU) * (ScanRatio − YellowS)/ (RedS − YellowS)) |
|      if YellowS < Scan Ratio < RedS (YELLOW) |
|    MIN(100, RedU + ((ScanRatio − RedS) * RedU)/RedS |
|      if Scan Rate >= RedS (RED) |

Exemplary Results:

| Scan Ratio | Memory Utilization | Condition |
|---|---|---|
| 0 | 0 * (50/5) = 0 | Healthy |
| 2 | 2 * (50/5) = 20 | Healthy |
| 4 | 4 * (50/5) = 40 | Healthy |
| 6 | 50 + (90 − 50) * (6 − 5)/(9 − 5) = 60 | Warning |
| 8 | 50 + (90 − 50) * (8 − 5)/(9 − 5) = 80 | Warning |
| 9 | min(97, 90 + (9 − 9) * 90/9) = 90 | Critical |
| 9.5 | min(97, 90 + (9.5 − 9) * 90/9) = 95 | Critical |
| 10 | min(97, 90 + (10 − 9) * 90/9) = 97 | Critical |

4. Server Response—The Server Response component index is entirely dependent on the Domino Server.Availability Index (SAI) and the disposition of the database server task. The SAI values range from 100 (fully available) to 0 (not available). Such index may be quite volatile, so in order to minimize the effect of a spike in the SAI, the Sever Response, in the illustrative embodiment, is based on the average of a series of observed values for SAI. In general, the most recent five SAI readings, averaged, with the algorithm used to generate the component is shown below:

ServerResponse=100−(Average of last five readings
     of server.AvailabilityIndex)

EXAMPLE

The most recent five SAI readings are: 95, 90, 80, 85, 90.

ServerResponse=100−((95+90+80+85+90)/5)=100−
     88=12

The sliding scale value is used only for purposes of determining the Composite Index, as described herein. To calculate the generalized Sliding Scale formula for Server Response the following algorithm is used:

Define: w=weighting
     tamber=Warning Threshold
     tred=Critical Threshold

Weighted ServerResponse=w*ServerResponse (if ServerResponse<=tamber) HEALTHY (w*tamber)+((100−(w*tamber))*(ServerResponse−
     tamber))/(tred−tamber)

(if tamber<ServerResponse<tred) WARNING
100 (if ServerResponse>=tred) CRITICAL

EXAMPLE w=20%=0.20
tamber=amber trigger=30 (i.e. 50<Server.AvailabilityIndex<70)
tred=red trigger=50 (i.e. Server. AvailabilityIndex<=50)

Sliding Scale ServerResponse=0.20*ServerResponse if ServerResponse<=30 HEALTHY

6+((94*(ServerResponse−30))/20)

if 30<ServerResponse<50 WARNING
100 ServerResponse>=50 CRITICAL

Exemplary Results:

| SAI | ServerResponse | SlidingScale Server Response |
|-----|----------------|------------------------------|
| 100 | 0 | 0 |
| 95 | 5 | 0.2 * 5 = 1.0 |
| 90 | 10 | 0.2 * 10 = 2.0 |
| 85 | 15 | 0.2 * 15 = 3.0 |
| 80 | 20 | 0.2 * 20 = 4.0 |
| 70 | 30 | 0.2 * 30 = 6 |
| 65 | 35 | 6 + (94 * 5/20) = 29.5 |
| 60 | 40 | 6 + (94 * 10/20) = 53 |
| 55 | 45 | 6 + (94 * 15/20) = 76.5 |
| 50 | 50 | 100 |
| 40 | 60 | 100 |

In the Server Health Monitor Health Report, the Server Response component rating value is unweighted, and without sliding scale factoring. The Server Response component appears in the Health Report displayable through the user interface of the Administrative client module 406.

5. Disk Utilization—This blended statistic requires user input at configuration time in order to know the disk configuration. Disk Utilization Rating component is applicable only on systems where the Domino Platform statistics are available and enabled. Therefore this metric is supported if each of the following is true if the Domino version is R5.0.2 or greater, the Platform Stats are Enabled, and the operating system for the server being monitored is Windows NT/2000, as long as Disk counters areenabled (diskperf), AS/400, Solaris, AIX. At configuration time first, define AvgDiskQueueLength =
  Platform.LogicalDisk._Total.1._Total.1.AvgQueueLength for
an R5.x server
  Platform.LogicalDisk.#.AvgQueueLen     for an R6
server where #=1, 2, 3, . . .
For R6, the "most active" disk is detertmined by finding the highest value of
Platform.LogicalDisk.#.AvgQueueLen
  where #=1, 2, 3, . . .
Assuming that N is the value of #, the name of the most active disk is given by
Platform.LogicalDisk.N.AssignedName
Actually, the average of the last 5 observed values of AverageDiskQueueLength is taken in order to minimize the effect of a single aberrant reading.

The AvgQueueLength is multiplied by 100 to give an initial "0 to 100" based rating:

Disk Utilization Rating=100*AvgDiskQueueLength

If the number of spindles (NumSpindles) for the disk is known, we should then divide by this value:

Disk Utilization Rating=100*AvgDiskQueueLength/
  NumSpindles

Note that If we define the default Warning/Critical thresholds to be 80 and 100, then we would have a Warning condition if the AvgQLen>0.8 and Critical if AvgQLen>1.0. However, there may be environments where a 1.0 AvgQLen is perfectly acceptable, in which case the administrator would want to be able to adjust the threshold settings so that an unhealthy condition would not be flagged at that point. Since this rating is based on 0-100, this formula does not provide any upward adjustment of the red value beyond 100. Therefore, to allow the administrator more flexibility in setting thresholds, the formula was adjusted, in essence the rating is halved, giving:

Disk Utilization Rating=50*AvgDiskQueueLength/
  NumSpindles where AvgDiskQueueLength is as defined above
  NumSpindles=# disk spindles reported by Administrator in RedZone configuration
  The default value for NumSpindles is 1.
In this way, a reading of 100 is achieved when the Avg Queue Len reaches 2. If the default thresholds are now redefined to be 40 and 50, we continue to have an environment where the WARNING threshold is reached with a QLen=0.8 and CRITICAL is reached with a QLen=1.0. However, in those environments where a 1.0 QLen is acceptable, the administrator can adjust the thresholds to, say, 70 and 90 (QLen=1.4 and 1.8)
For Solaris, the disk utilization formula is based on the Platform statistics, PctTime and ServiceTime, where
  PctTime=percentage of time that the disk is being accessed,
  ServiceTime=the time in milliseconds to service a disk request.
  PctTime=Platform.LogicalDisk._Total.1._Total.1.PctTime (R5.x)
  Platform. LogicalDisk.#.PctUtil for an R6 server
    where #=1, 2, 3, . . .
  ServiceTime=Platform.LogicalDisk._Total.1._Total.1.
    ServiceTime (R5.x)
  Platform.LogicalDisk.#.ServiceTimeinmsecs (R6)
    where #=1, 2, 3, . . .

Disk Utilization Rating =
  PctTime         if PctTime < 20
  min(100, max(20, ServiceTime))     if PctTime >= 20

For R6, the "most active" disk is detertmined as follows:
For each disk (1, 2, 3, . . . ), given its PctTime and ServiceTime metrics,
  a Disk Utilization Rating is generated
The disk (call it N) which has the highest Disk Utilization rating is designated as
the most active disk, and its name is obtained from Platform.LogicalDisk.N.AssignedName
default thresholds: AMBER=40, RED=50

Cannot obtain Disk Utilization for the Notes data drive because there is no way to identify which of the Platform Disk Stats for individual drives corresponds to the Notes data drive For AIX, only the PctTime metric is available, so we have
Disk Utilization Rating=max (Plafform.LogicalDisk.#.PctUtil)
where #=1, 2, 3, . . .

The "most active" disk is determined given the value of # corresponding to the highest value of Platform.LogicalDisk.#.PctUtil. The disk (call it N) which has the highest Disk Utilization rating is designated as the most active disk, and its name is obtained from Platform.LogicalDisk.N.AssignedName
default thresholds: AMBER=40, RED=50

For AS/400, only the PctTime metric is available, therfore Disk Utilization Rating=Plafform.LogicalDisk._Total.1._Total.1. PctTime
default thresholds: AMBER=40, RED=50

If the Disk Utilization Rating becomes critical, the following are suggested actions:
1. If this server is being used for messaging,
    Increase the number of mailboxes (mail.box files) via the Server's Domino Directory:
        Configurations->Router/SMTP->Basics->Number of mailboxes
2. Use file links to distribute Notes databases among multiple logical disk units
3. Be sure that the page file is on a separate disk from the Notes data.
4. Be sure that the Notes transaction log file is on a separate disk from the Notes data.
5. Use hardware RAID to create stripe sets with multiple drives.

Generalized Sliding Scale formula for Disk Utilization is a s follows:

Define: w=weighting
    twarning=warning threshold
    tcritical=critical threshold

---

Sliding Scale DiskUtilization =
    w * DiskUtilization
        (if DiskUtilization <= tamber)        HEALTHY
    (w * tamber) + ((100 − (w * tamber)) * (DiskUtilization − tamber))/(tred − tamber)
        (if tamber < DiskUtilization < tred)   WARNING
    100
        (if DiskUtilization >= tred)           CRITICAL

---

EXAMPLE w=10%=0.10, tamber=40, tred=50

---

Sliding Scale Disk Utilization =
    0.1 * DiskUtilization      if DiskUtilization <= 40,   HEALTHY
    4 + 96 * (DiskUtilization − 40)/10    if 40 < DiskUtilization < 50, WARNING
    100                        if DiskUtilization >= 50   CRITICAL

---

Exemplary Results:

| DiskUtilization | Sliding Scale DiskUtilization |
|---|---|
| 10 | 1 |
| 20 | 2 |
| 30 | 3 |
| 40 | 4 |
| 42 | 23.2 |
| 45 | 52 |
| 48 | 80.8 |
| 50 | 100 |
| 100 | 100 |

6. Network Utilization—A blended statistic reflects the performance of a process with regard to a network connection. The algorithm for the index is used to collect error and collision rates and bandwidth information. The algorithm used to generate the component index is described hereafter. Network Utilization index is supported by Domino 6.0 and Win32, Solaris, and AIX servers. Define the following formulas for Network Utilization:

NetBandwidthUtil=Platform.Network.#.PctUtilBandwidth where # (1, 2, 3, . . . ) is the instance of the "busiest" Network Adapter For a system with only one adapter, there is only one instance. However, for a server with more than one adapter, the system examines the utilization of each adapter and reports on the one with the highest value of percent utilized network bandwidth. A NetBandwidthUtil value of 30% should be signaled as a warning, and a value of 40% may be flagged as critical. These threshold values are defaults and may be modified by the Administrator. For the purpose of this example set

---

| twarn=30 | Warning Threshold |
|---|---|
| tcrit=40 | Critical Threshold |

---

The network collision rate is given by the Domino statistic:

Platform.Network.#.PctCollisionRate where # (1, 2, 3, . . . ) is the instance of the "least healthy" Network adapter. For a system with only one adapter, there is only one instance. However, for a server with more than one adapter, the system examines the statistics of each adapter and reports on the one with the highest collision rate.

"Collision Rate"=proportion of packet collisions. A 5%-10% collision rate implies saturation. So, define the Warning and Critical thresholds as 5% and 10%.

A formula that maps to the Bandwidth Utilization formula is defined so that
    a 5% PctCollision Rate results in a rating of 30, which is the Warning threshold
    a 10% PctCollision Rate results in a rating of 40, which is the Critical threshold NetCollision=twarn*Plafform.Network.#.PctCollisionRate/5
    if Plafform.Network.#.PctCollisionRate<5 twarn+(tcrit−twarn)*(Platform.Network.#.PctCollisionRate−5)/5
    if 5<=Platform.Network.#.PctCollisionRate<10 min(97, tcrit*Platform.Network.#.PctCollisionRate/ 10)

if Plafform.Network.#.PctCollisionRate>10

On servers that provide both Bandwidth Utilization and Collision Rate, the system will report the value of the "less healthy" metric.

Formula Definition:
  NetUtil=MAX(NetBandwidthUtil, NetCollision) otherwise (on Win32) we have
  NetUtil=NetBandwidthUtil Generalized Sliding-Scale Formula for Network Utilization:
  Define: w=weighting
    twarn=warning threshold
    tcrit=critical threshold

---

Sliding Scale Network Utilization =
  w * NetUtil (if NetUtil < twarn)          HEALTHY
  (w * twarn) + ((100 − (w * twarn)) * (NetUtil − twarn))/(tcrit − twarn)
      (if twarn < NetUtil < tcrit) WARNING
  100 (if NetUtil >= tcrit)         CRITICAL

---

EXAMPLE w=5%=0.05, twarn=30, tcrit=40

---

Sliding Scale NetUtil = 0.05 * NetUtil
  (if NetUtil <= 30) GREEN
  1.5 + (98.5 * (NetUtil − 30)/10) (if 30 < NetUtil < 40) WARNING
  100    (if NetUtil >= 40) CRITICAL

---

Exemplary Results:

| NetUtil | SlidingScale NetUtil |
|---|---|
| 10 | 0.05 * 10 = 0.5 |
| 20 | 0.05 * 20 = 1.0 |
| 30 | 0.05 * 30 = 1.5 |
| 32 | 1.5 + (95.5 * 2/10) = 20.6 |
| 35 | 1.5 + (95.5 * 5/10) = 49.25 |
| 38 | 1.5 + (95.5 * 8/10) = 77.9 |
| 40 | 1.5 + 95.5(10/10) = 97 |
| 50 | 97 |
| 100 | 97 |

7. Addressee Resolution Efficiency (NRPC Name Lookup Response) is a component index that indicates the average name lookup time for the current observation interval is determined by dividing the difference in total lookup time by the difference in total number of lookups. Given the following domino server process statistics:
  Database.NAMELookupTotal//total # of Name Lookups
  Database.NAMELookupTotalLookupTime//aggregate lookup time (ms)
    define:
      deltaLookups=difference in # of Lookups performed between measurements
      deltaLookupTime=difference in Total Lookup Time between measurements so that,
  AvgNameLookupTime=deltaLookupTime/deltaLookupTotal
    (if deltaLookupTotal>0)
  0 (if deltaLookupTotal==0)

In either case, given an Average Name Lookup Time (i.e. vgNameLookupTime), define
  NRPC Name Lookup=AvgNameLookupTime/20
    if AvgNameLookupTime<1940 ms
  97 if AvgNameLookupTime>=1940 ms Exemplary Results:

| AvgNameLookupTime (ms) | NRPC Name Lookup |
|---|---|
| 60 | 3 |
| 100 | 5 |
| 200 | 10 |
| 500 | 25 |
| 800 | 40 |
| 1000 | 50 |
| 1200 | 60 |
| 2000 | 100 |
| 5000 | 100 |

Given defined predefined default threshold values of 40 and 60. When the NRPC Name Lookup rating reaches 40 (equivalent to an 800 ms lookup time), a warning condition results. If the rating reaches (1200 ms lookup time), the condition becomes critical.

As an alternative, the "change" in the average lookup time from the previous reading to the current reading can be examined in order to detect a recent degradation. For example, if given:
  AvgLookupTime(Prev) and AvgLookupTime(Current),
    Define DeltaAvgLookupTime=AvgLookupTime(Curr)−AvgLookupTime(Prev)

Therefore, a positive DeltaAvgLookupTime may be a sign of performance degradation.

The generalized algorithm for NameLookup is as follows:
  Define: w=weighting
    twarn=warning threshold
    tcrit=critical threshold

---

Sliding Scale NameLookup =
  w * NameLookup
    (if NameLookup <= twarn)          HEALTHY
  (w * twarn) + ((100 − (w * twarn)) * (NameLookup − twarn))/(tcrit − twarn)
    (if twarn < NameLookup < tcrit)   WARNING
  97 (if NameLookup >= tcrit)         CRITICAL

---

EXAMPLE w=20%=0.20, twarn=40, tcrit=60

---

Sliding Scale NameLookup = 0.20 * NameLookup
  (if NameLookup <= 40)           HEALTHY
  8 + 92 * (NameLookup − 40)/20
    (if 40 < NameLookup < 60)     WARNING
  97 (if NameLookup >= 60)        CRITICAL Exemplary Results:

| AvgNameLookupTime(ms) | Name Lookup Rating | Sliding-Scale |
|---|---|---|
| 100 | 5 | 1 |
| 250 | 12.5 | 2.5 |
| 400 | 20 | 4 |
| 800 | 40 | 8 |
| 900 | 45 | 8 + 92 * 5/20 = 31 |
| 1000 | 50 | 8 + 92 * 10/20 = 54 |
| 1100 | 55 | 8 + 92 * 15/20 = 77 |
| 1200 | 60 | 100 |
| 2000 | 100 | 100 |

8. HTTP Response—A component index used to measure the hypertext transport performance if the server process complies with the HyperText Transport Protocol. The HTTP Response rating is based on average time to process an HTTP request. For Rev 6.0 servers, the Domino stats for HTTP Requests processed and Request Time are used. For Rev 5.x or earlier servers Domino servers, with no such statistics available, the HTTP response component is generated only if the QOS HTTP Probe (self-probe) is configured.

1. Domino 6 Servers

The following Domino stats (supported in Domino 6 only) are used in evaluating HTTP Response Http.Worker.Total.RequestsProcessed (aggregate number of HTTP requests)

Http.Worker.Total.TotalRequestTime (aggregate processing time (ms) for the HTTP requests)

These statistics represent the total values since the server has been running. Since the system objective is to determine the "recent" average request processing time, the difference between the most recent observations of these statistics is taken as follows:

Define
    deltaRequests=# of Requests Processed in the most recent monitoring interval
    deltatime=Total Request Time within the most recent monitoring interval so that, an average request processing time (in milliseconds) is obtained:

AvgTime=deltaTime/deltaRequests (if deltaRequests>0)

0 (if deltaRequests==0)

2. Rev. 5 and Earlier Domino Servers

The HTTP Response component is provided only if the QOS HTTP Probe self-probe) is configured for that server. In this case:

AvgTime=QOS Time where QOS Time is the average of (up to) the last 5 observations of the server's reported QOS HTTP response time (in milliseconds). In either case, define

---

HTTP Response =
    99    if the HTTP server task is running, but is not responding to the Server Health Monitor
    98    if the HTTP server task is running, but is reporting fatal errors
    min(97, AvgTime/40)    if the HTTP server task is running and at least one HTTP lookup has been recently issued -continued 1    if the HTTP server task is running and no HTTP lookups have been recently issued

---

The HTTP Response component carries a 5% weight toward the composite index. The default Warning and Critical thresholds for HTTP Response are 40 and 60, which leads to the following exemplary results:

| AvgTime (ms) | HTTP Response | Condition |
|---|---|---|
| 400 | 10 | Healthy |
| 800 | 20 | Healthy |
| 1200 | 30 | Healthy |
| 1600 | 40 | Warning |
| 1800 | 45 | Warning |
| 2000 | 50 | Warning |
| 2200 | 55 | Warning |
| 2400 | 60 | Critical |
| 3000 | 75 | Critical |
| 3600 | 90 | Critical |
| >=3880 | 97 | Critical |

1. Disable HTTP Server Logging (to domlog.nsf and/or text file)

This recommendation is generated only if the system 400 determines that either of the logging options is enabled.

2. Offload Users to Another Server

Generalized sliding-scale formula for HTTP Responseis a s follows:

Define: w=weighting
        tamber=amber trigger
        tred=red trigger

---

Sliding Scale HTTP Thread Utilization =
    w * HTTP Response    if HTTP Response < tamber HEALTHY
    (w * tamber) + ((97 − (w * tamber)) * (HTTP Response − tamber))/(tred − tamber)
        if tamber <= HTTP Response <= tred WARNING
    97    if HTTP Response > tred CRITICAL

---

EXAMPLE w=5%=0.05, tamber=40, tred=60

---

Sliding Scale HTTP Response =
    0.05 * HTTP Response    (if HTTP Response < 40) HEALTHY
    2 + (95 * (HTTP Response − 40)/20) (if 40 <= HTTP Response < 60) WARNING
    97    (if HTTP Response >= 60) CRITICAL

---

Exemplary Results:

| HTTP Response | SlidingScale HTTP Response |
|---|---|
| 10 | 0.05 * 10 = 0.5 |
| 20 | 0.2 * 20 = 1.0 |
| 30 | 0.2 * 30 = 1.5 |

-continued

| HTTP Response | SlidingScale HTTP Response |
|---|---|
| 40 | 2 |
| 45 | 2 + (95 * (45 − 40)/20) = 25.75 |
| 50 | 2 + (95 * (50 − 40)/20) = 49.5 |
| 55 | 2 + (95 * (55 − 40)/20) = 73.25 |
| 60 | 97 |
| 100 | 97 |

9. LDAP Response—A component index used to measure the directory access performance if the server process complies with the Lightweight Directory Access Protocol. If the server being monitored is running the LDAP process, the system 400 will report on the health of this component. If the server is not running the LDAP process, the system 400 will not provide a report on this component. The value of the LDAP component can be taken from the LDAP response statistic as follows:

Given the Following Domino Statistics

LDAP.Total LDAP Searches //total # of Name Lookups

LDAP.Total LDAP Search time //aggregate lookup time (ms)

define deltaLookups=difference in # of Lookups performed between measurements deltaLookupTime=difference in Total Lookup Time between measurements so that, $$AvgNameLookupTime = deltaLookupTime/deltaLookups$$

(if deltaLookupTotals>0)

0 (if deltaLookups==0)

```
LDAP Response =
    99          if the LDAP server task is
running, but is not responding to the Server Health Monitor
    98          if the LDAP server task is
running, but is reporting fatal errors
    min(97, AvgNameLookupTime/20)   if the LDAP server task is
running and at least one LDAP lookup has been recently issued
    1           if the LDAP server task is
running and no LDAP lookups have been recently issued
```

EXAMPLE

| AvgNameLookupTime | LDAPResponse |
|---|---|
| 50 | 2.5 |
| 100 | 5.0 |
| 250 | 12.5 |
| 500 | 25 |
| 1000 | 50 |
| 2000 | 100 |

As an alternative, we could examine the "change" in the Average Lookup time from the previous reading to the current in order to detect a degradation. For example, if AvgLookupTime (Prev) and Avg LookupTime(Current), define $$DeltaAvgLookupTime = AvgLookupTime(Curr) - AvgLookupTime(Prev)$$

Therefore, a positive DeltaAvgLookupTime may be a sign of performance Degradation. The generalized formula for LDAP Response is as follows:

Define: w=weighting that this component contributes to the Overall Health Index twarn=warning threshold=rating above which the component is in a Warning state tcrit=critical threshold=rating above which the component is in a Critical state

```
Sliding Scale LDAP Response =
    w * LDAP Response
        (if LDAP AddresseeResolutionEfficiency <= twarn)
HEALTHY
    (w * twarn) + ((97 − (w * twarn)) * (LDAP Response− twarn))/(tcrit − twarn)
        (if twarn < LDAPAddresseeResolutionEfficiency < tcrit)
WARNING
    97 (if LDAPAddresseeResolution Efficiency >= tcrit)
CRITICAL
```

EXAMPLE w=20%=0.20 twarn=warning threshold=40 tcrit=critical threshold=60

```
Sliding Scale LDAP Response =
    0.20 * LDAP Response
        (if LDAP Response <= 40)          HEALTHY
    8 + 89 * (LDAP Response − 40)/20
        (if 40 < LDAP Response < 60)      WARNING
    100 (if LDAP Response >= 60)          CRITICAL
```

| LDAPAvgLookupTime(ms) | LDAP Response | Sliding-Scale |
|---|---|---|
| 100 | 5 | 1 |
| 500 | 25 | 5 |
| 750 | 37.5 | 7.5 |
| 800 | 40 | 8 |
| 900 | 45 | 8 + 89 * 5/20 = 30.25 |
| 1000 | 50 | 8 + 89 * 10/20 = 52.5 |
| 1100 | 55 | 8 + 89 * 15/20 = 74.75 |
| 1200 | 60 | 97 |
| 1500 | 75 | 97 |
| 2000 | 97 | 97 |

10. IMAP Response—A component statistic used to measure mail access performance if the server process complies with the Internet Mail Access Protocol. If the server being monitored is running the IMAP process, the Server Health Monitor will report on the health of this component. If the server is not running the IMAP process, the system will not provide a report on the IMAP Response component. The value of the IMAP component can be taken from the IMAP response statistic as follows:

```
IMAP Response =
    99      if the IMAP server task is running, but is
not responding to the Server Health Monitor
    98      if the IMAP server task is running, but is
reporting fatal errors
        min(97, QOSTime/20) if the IMAP server task is running and the
QOS IMAP Self-Probe is configured for the server
    1       if the IMAP server task is running and the
QOS IMAP Self-Probe is not configured for the server
```

QOSTime is the average of (up to) the last 5 observations of the server's reported Quality of Service (QOS) IMAP response time (in milliseconds). The IMAP Response component carries a 5% weight toward the blended/overall server health value. The default Warning and Critical thresholds for IMAP Response are 40 and 60, which leads to the following exemplary results:

| Average IMAP Response Time (ms) | IMAP Response | Condition |
| --- | --- | --- |
| 200 | 10 | Healthy |
| 400 | 20 | Healthy |
| 600 | 30 | Healthy |
| 800 | 40 | Warning |
| 900 | 45 | Warning |
| 1000 | 50 | Warning |
| 1100 | 55 | Warning |
| 1200 | 60 | Critical |
| 1500 | 75 | Critical |
| 1800 | 90 | Critical |
| >=1940 | 97 | Critical |

Composite Index

Given the values of the relevant component indexes listed above, a composite index is generated by analyzer module 404 using a weighting algorithm. The Composite Index serves as an overall health index for the monitored process and is the composite rating derived from the individual component ratings. Each individual rating is calculated via its corresponding algorithm described herein. In each case, the algorithm generates a value between 0 (GOOD) and 100 (BAD). This value is multiplied by the relative weight assigned to that area to give a weighted rating. For example, if the "Server Response" rating is 45, and it is assigned a relative weight of 20%, its weighted rating would be 45×0.20=9.0. The sum of the 10 weighted ratings is the Composite Index, a value between 0 (GOOD) and 100 (BAD). For example, given the indicated ratings and weightings for each area below, the weighted ratings are calculated and totaled to obtain the Composite Index as follows:

| Component | Rating | Weighting | WeightedRating |
| --- | --- | --- | --- |
| Server Response | 45 | 20% | 9.0 |
| CPU Utilization | 34 | 15% | 5.1 |
| Disk Utilization | 42 | 15% | 6.8 |
| Memory Utilization | 14 | 15% | 2.1 |
| Mail Delivery Latency | 2 | 10% | 0.2 |
| Network Utilization | 28 | 5% | 1.9 |
| LDAP Response | 6 | 5% | 0.3 |
| HTTP Response | 24 | 5% | 1.2 |
| IMAP Response | 4 | 5% | 0.2 |
| TOTAL | | | 28.2 |

Accordingly, the composite index for the above example would have a value of 28.2. Special consideration is given to circumstances when a particular component index has become critical. Two examples of a critical condition are: 1) percent CPU Utilization exceeds 85%; and 2) Available Memory falls below 1%. In the case of a "critical condition" for an individual component, the relative weight that is normally assigned to the area may be abandoned in favor of a value that will trigger a CRITICAL "Overall" rating, regardless of the healthy status of the other components. For example, if CPU utilization is 100%, the normal 0.20 weight would result in a weighted statistic of 20, which, if no other areas are in a critical state, would likely not result in a critical Overall Rating if the individual weighted ratings were added. To handle such a situation, the 0-100 range of each component value is subdivided into three zones: HEALTHY, WARNING, and CRITICAL. The range for each of the three zones is delineated by two thresholds: 1) the Warning threshold is the rating value above which the focus area becomes significant; and 2) the Critical threshold is the value above which the focus area is critical. For example, the CPU Rating has a Warning threshold of 75 and Critical threshold point of 85. In such case a Rating at or below 75 is HEALTHY, a Rating between 75 and 85 is WARNIING, and a Rating above 85 is CRITICAL. If the Rating is in the HEALTHY zone, the component's Sliding Scale Rating is simply the Rating multiplied by the assigned weighting. If the Rating is in the CRITICAL zone, the Sliding Scale Rating is set equal to the maximum possible value, e.g. 100. If the Rating is in the WARNING zone, the Sliding Scale Rating is an intermediate value and must be escalated beyond a simple weighting, but not to the point of signaling a critical condition.

Therefore, using the original formula, a weighting, and trigger points, the "Sliding Scale" may be defined with the following algorithm:

Generalized Sliding Scale:
Define:
Rating=the value (0–100) obtained from the formula (without weighting)
w=Weighting that the component contributes to the Overall Health Index
    twarn=Warning threshold=rating above which the component is in a
Waning state
    tcrit=Critical threshold=rating above which the component is in a Critical state

```
Sliding Scale Rating:
    w * Rating       (if Rating <= tamber) HEALTHY
        (Simply apply the specified weight)
    (w * tamber) + ((100 − (w * tamber)) * (Rating − tamber)/(tred − tamber))
                     (if tamber < Rating < tred) WARNING
    100              (if Rating >= tred) CRITICAL
```

For example, consider the CPU Utilization Rating (CPU), and assume that it has a 20% weighting, the Amber trigger point is 75, and the Red trigger point is 85:
w=20%=0.20
tamber=Warning threshold=75
tred=Critical threshold=85 and the Weighted Overall CPU Utilization=0.20*CPU
    (if CPU<=75) HEALTHY

15+((100−15)*(*CPU*−75)/(85−75))=15+(85*(*CPU*−75)/10)

if 75<CPU<85) WARNING
100 (if CPU>=85) CRITICAL
at 25% CPU, the weighted utilization=5
at 60% CPU, the weighted utilization=12
at 75% CPU, the weighted utilization=15
at 80% CPU, the weighted utilization=15+42.5=57.5
at 90% CPU, the weighted utilization=100

In the light of the above, if one component index is CRITICAL then the overall index statistic is critical, and, if none of the individual component indexes are CRITICAL, then the composite index will not be critical.

There are scenarios when one or more component index cannot be calculated. In the illustrative embodiment, the weighing algorithm, as described hereafter, accounts for the presence or absence of specific component index values. For example, consider the case where the CPU Utilization component index cannot be obtained (e.g. because the platform statistics are not supported or enabled), and assume that the weighting for CPU toward the blended statistic is 20%. In this case the value of each of the remaining statistics would be adjusted by that factor. For example, the following weighted/sliding-scale ratings were calculated:

| | |
|---|---|
| CPU (unavailable) = | 0 |
| Mail Delivery Latency = | 8 |
| Server.Users Utilization = | 32 |
| Memory Utilization = | 12 |
| Server Response = | 6 |

-continued

| | |
|---|---|
| Disk Utilization = | 22 |
| Network Utilization = | 2 |
| Network Utilization = | 2 |
| TOTAL = | 84 = AMBER |

If the CPU Utilization component index carries a 20% weighting and is unavailable, then the other component indexes must be increased by a factor of 100/(100−20)=1.25, giving yielding the following weightings:

| | |
|---|---|
| Mail Delivery Latency = | 1.25 * 8 = 10 |
| Server.Users Utilization = | 1.25 * 32 = 40 |
| Memory Utilization = | 1.25 * 12 = 15 |
| Server Response = | 1.25 * 6 = 7.5 |
| Disk Utilization = | 1.25 * 22 = 27.5 |
| Network Utilization = | 1.25 * 2 = 2.5 |
| Addressee Resolution = | 1.25 * 2 = 2.5 |
| TOTAL = | 1.25 * 84 = 105 = RED |

In this manner, server processes which do not adhere to certain protocols, such as HTTP, LDAP, or IMAP, will not have the corresponding component indexes associated with those protocols factored into the overall composite index value.

The algorithm for the composite index further compensates for the scenario when a component with a lesser weighting becomes critical, e.g. should the condition where a component with a 5% weighting becomes critical be considered equivalent to one where a component with a 20% weighting becomes critical? The following is the formula used to calculate the final major blend, based on the final state of the process (GREEN, YELLOW, or RED), and the overall blended statistic=sum of the minor blends, (capped at 100):

```
if (Final State = 0,          // GREEN
    Final Value = Overall Value // guaranteed to be in GREEN range
else
if (Final State = 1)          // YELLOW
    if (Overall Value > Yellow Threshold)
        if (Overall Value < Red Threshold)
            // OK – the overall value is in the yellow range
            Final Value = Overall Value
        else
            // YELLOW state, but overall value in Red Range --> adjust
            if (Red Threshold < 100)
                // "high yellow", interpolate into upper half of yellow zone
                Final Value = Yellow Threshold
                    + 0.5 * (Red Threshold – Yellow Threshold)
  * (1 + (Overall Value – Red Threshold))/(100 – Red Threshold)
            else
                // "no red range", set = 95% into the yellow range
                Final Value = Yellow Threshold
                    + .95 * (Red Threshold – Yellow Threshold)
    else
        // YELLOW state, but overall value is in Green Range --> adjust
        // "low yellow", interpolate into lower half of yellow zone
        Final Value = Yellow Threshold + 0.5 * (Red Threshold – Yellow Threshold) * Overall Value/Red Threshold)
else
    // other than GREEN or YELLOW, assume RED (or BLACK)
    Final Value = Overall Value   //guaranteed to = 100
```

As will be understood from the above, the thresholds by which the values of the component indexes are analyzed may be defined by the particularities of the operating system and other configuration data with which the monitored process is executing. For example, a component index value for CPU utilization may be categorized as "caution" with one operating system given the platform resources but may be considered "normal" for another operating system given the same platform resources.

Recommendation minor blends may be used in conjunction with the component and composite indices described herein to build recommendations when server processes are showing poor performance. Most recommendation minor blends algorithms generate recommendations based on a specific value of a statistic in the source data or by comparison of a specific value of a statistic in the source with a predefined threshold, as explained hereafter with reference to column group 485 of table 414.

Recommendations

System 400 provides recommendations to administrators depending on the determined health of a monitored server process. System 400 presents to the user with a composite index value representing the overall server process health, the component index values representing the health of a particular performance aspect, one or more recommendation minor blends and a package of recommendations based on the foregoing. The inventive process utilizes the following assumptions. First, the state of every server process is determined, including the status of specific server tasks, server notes.ini settings, component index blended statistics, e.g. assessment of server health, and recommendation minor blended statistics, e.g. additional assessment of server state required to determine a recommendation. Second, the state of every server process is associated with one of a set of predetermined "server situations". A server situation is defined as a state that is supported by system 400. An entry situation is a server task state, an notes.ini setting (configuration setting), a component index or a recommendation minor blend result. Each server situation has a one-to-one correspondence with entries in a configuration truth table of situations. Third, the know situation for every server process is located in the configuration truth table, recorded in the recommendations worksheet, stored in the dommon.nsf and is presentable via the user interface of Administration Client module 404.

Analyzer module 404 utilizes multiple tables or worksheets stored in memory to convert the source data into a package of recommendations, including Configuration Truth Table 414, a Recommendations Table 416, a Comments Truth Table 415, worksheet for each component index, a worksheet for the minor recommendation blends, and various intermediate worksheets. The algorithms for the worksheets having been previously described, the organization and function of the major tables is described hereafter in greater detail.

Configuration Truth Table

Configuration Truth Table 414, illustrated in FIGS. 6A-D is stored in memory and comprises a compilation of cell used as a lookup mechanism to hold the "universe" of all possible server health conditions supported by the diagnostic system 400. Configuration Truth Table 414 is defined with two categories: one category for every entry in a server situation (rows of the table) and one category for every detail of the situation understood (the columns). FIGS. 6A-D illustrates an exemplary Configuration Truth Table 414 in accordance with the present invention. Since Configuration Recommendation Table 414 has numerous columns, multiple figures are use to display the various columns, although the table may be considered a single entity in memory. In FIGS. 6A-D, blank cell values at a particular row and column intersection indicate that the cell value is not relevant for that particular entry.

Each row of table 414 represents a combination of server conditions, based on the value(s) set in each of the columns. Some of the rows have been identified in first column 450 with a particular condition, e.g. Workstation CPU saturated, Mail Router enabled but not running, Memory Critical—AS400, etc. However, for the most part the rows are described sufficiently to distinguish between them.

For the most part, the columns of table 414 are grouped under a specified category, the name of which is listed above the column name. The following category/group names are listed below, along with a description of each of its "member" columns. Column 450 indicates in each different row thereof the name of the item(s) monitored and represents each possible items monitored by system 400 with respect to a specific process. As such this column is displayed in each of FIGS. 6A-D. The columns in group 452 of table 414, "Is Component Enabled", indicate whether the particular component is currently enabled for monitoring. A value of one (1) in the cell in the Truth Table indicates that the component is "enabled" while a zero (0) indicated that the component is not enabled. The following items comprise the columns of group 452:

e CPU Utilization
e Mail Delivery Latency
e Memory Utilization
e Server Response
e Disk Utilization
e Network Utilization
e NRPC Name Lookup
e HTTP Response
e LDAP Response
e IMAP Response The following items comprise the columns of group 454, "Component Indices" of table 414:

CPU Utilization
Mail Delivery Latency
Memory Utilization
Server Response
Disk Utilization
Network Utilization
NRPC Name Lookup
HTTP Response
LDAP Response
IMAP Response The values in the columns of group 454 of table 414, "Component Indices" are used to indicate the state of the particular component listed in column where:

0=never seen,
1=healthy,
2=warning,
3=critical,
4=fatal,
5=not responding,
6=not yet evaluated,
7=Admin Client CPU saturated
8=server down The following items comprise the columns of group 456 of table 414, "Server Task States," and represent the tasks for which state information is monitored:

DB Server
HTTP Web Server
IMAP Mail Server
LDAP Server
Router

The values in the columns of group 456 of table 414 are used to indicate the state of selected server tasks as follows:
- 0=task has never been seen running
- 1=task is currently not running,
- 2=task is not responding,
- 3=task is running,
- 4=task is running but generating warning messages,
- 5=task is running, but reporting failure conditions,
- 6=task is running, but reporting fatal conditions, The following items comprise the columns of group 458 of table 414, "Recommendation Minor Blend," and represent various server conditions or attributes which factor into the server health monitor recommendations, for each column item described, the possible values are provided in parentheses:

- OS Type—A number representing the operating system that the server is running where: (1=NT, 2=Win2K, 3=Solaris, 4=AIX, 5=Linux, 6=OS400, 7=OS/2, 8=HP_UX, 9=NetWare, 10=OS390).
- Need Mail.Box—This server should be configured with an additional mail. box (Yes)
- Need Delv Threads—This server should be configured with additional mail delivery threads (Yes)
- Need Xfer Threads—This server should be configured with additional mail transfer threads (Yes)
- MailWaitDNS—This server has mail that is waiting for resolution of an external address (Yes)
- NeedNumSpindles—The Server Health Monitor needs disk spindle information to be provided in order to properly analyze Disk Utilization on the server (Yes)
- Busiest Task—(NO LONGER USED)
- Buffer Pool Status—The amount of allocated buffer pool for Domino is excessive (High)
- DbCacheStatus—The Domino database cache is insufficient (Low)
- Add Memory—Additional memory is recommended for this server (Yes)
- High Paging—The system page file utiliation is excessive (Yes)
- Add Worker Threads—This server should be configured with additional worker threads (Yes)
- Add CPU—An additional processor is recommended for this system (Yes)
- High CPU Queue—The server has an extremely high processor queue length. (Yes)
- TooManyUsers—(NO LONGER USED)
- AddHTTPThreads—(NO LONGER USED)
- DisableHTTPLog—The server's performance may be improved if HTTP logging were disabled.(Yes)
- LDAPfromQOS—The Server Health Monitor's analysis of LDAP Response is based on Qualiy of Service (QOS) statistics reported from the process.
- HTTPfromQOS—The Server Health Monitor's analysis of HTTP Response is based on Qualiy of Service (QOS) statistics reported from the process.
- Disk Metric—A numeric value representing the type of disk statistic used in analysis of Disk Utilization (1=Disk Queue Length of Busiest Disk where Disk Queue Length=avg number of disk requests waiting to be processed; 2=Queue Length of Notes Data Disk, 5=Sum of Queue Lengths of all disks, 11=%Disk Time=% of the time that the disk is being accessed, 21=Disk Service Time=average time taken to process a disk request)
- Add Network Bandwidth—This server's performance would be improved if the network bandwidth were increased(Yes)
- High Network Collision—A high network collision rate has been seen on this server (Yes)
- Over 100% Network Bandwidth Util—This server's network configuration must be corrected and/or its network adapters and drivers must be updated.(Yes)
- Move View Rebuild Dir—The current location assigned for rebuilding Domino views should be changed to another disk(Yes)

The values of the Recommendation Minor Blend statistics described above for the most part are determined directly from the source data collected by collector module 402. To the extent that any values need to be calculated, such calculation are performed by analyzer module 404 and are within the scope of those skilled in the arts, given the descriptions contained herein.

The columns of group 460 of table 414, "Short Term," and contain numeric codes under columns Code 1 through Code 8 which represent a plurality of short term recommendations to improve server health. Similarly, the columns of group 462, "Long Term," and contain numeric codes under columns Code 1 through Code 8 which represent a plurality of long term recommendations to improve server health.

Column 464 of table 414 of table 414, "Reason for this State" contains a numeric code that represents a statement that summarizes the current overall state of the server item identified in a row of column 450, e.g. Code 1349 from row 3 of column 1450 when mapped to table 416 is translated into "The Database Server task is loaded but not responding."

The columns of group 466 of table 414, "You Have" contain numeric codes under columns Code 1 through Code 6 that represents plural information pieces regarding a current server setting or a statistic that substantiates the reported unhealthy server condition. For example, code 10201, which appears in row 21 under the Code 1 column of group 466 when mapped to table 416 is translated into "Amount of Installed RAM (MB)." Similarly, code 10202, which appears in row 21 under Code 2 column of group 466 is translated into "Amount of Available RAM (MB)." For a server that is low on memory, the Health Report presented by a UI of Administration client module 406 would include the amount of installed memory and latest observed available memory, as evidence that there is a problem.

Column 468 of table 414 represents the row number of the truth table 414, and is used to cross reference the results with a particular truth table lookup entry.

Recommendation Table

The Recommendations Table 416 displays the current state of every server process, i.e. the situation of every server. Included for each server are the current state of tasks, notes.ini settings, and the current results of minor blended statistics and recommendation minor blended statistics blends. Recommendations table 416 worksheet is defined with two categories: one category for every entry in a server situation and one category for every server being monitored. FIGS. 7A-E illustrates an exemplary Results Recommendations Table 416 in accordance with the present invention.

FIGS. 7A-E illustrate the Recommendation Table 416. Like Configuration Table 414, since Recommendation Table 416 has numerous columns, multiple figures are use to display the various columns, although the table may be considered a single entity in memory. As illustrated in 7A, Recommendation Table 416 consists of a first column 470 which includes a row for each monitored server, the name of the server being listed in the row. The remaining column groups 472, 474, 476, 478, 480, 482, 484,486 and 488 of table 416 have the same columns titles and definitions as column groups 452, 454, 456, 458, 460, 462, 464, 466 and 468, of table 414, respectively, and will not be described in further detail. In Recommendation table 416, the values in column group 480 "Short Term Codes" and 482 "Long Term Codes" are determined by finding the row from the Truth Table 416 that matches the condition in Configuration table 414 and then copying the appropriate recommendation codes from table 414 the matching row entry into the columns under the "Short Term Codes" and "Long Term Codes" in table 416. In this manner configuration table 414 is used as a universal reference look-up table to fill in the appropriate recommendation code entries which match the situations of specific server entries in recommendation table 416.

The pertinent statistics/settings that correspond to an unhealthy condition are copied from the various algorithm worksheets 412 utilized by analyzer module 404 into the multiple column group 486 "You Have Codes." In addition, recommendation table 416 further comprises a column group 490 "You Have Values." The You Have Codes are numerical values that represent a descriptive label for a statistic while You Have Value is the actual value of the statistic. For example, in row 7 of column 470 of table 416 corresponding to the server named "Frog/Iris" in FIG. xD, the value under the Code 1 column of the You Have Codes group 486 equals 10201, which when translated via comments table 415 produces the label "Amount of Installed RAM (MB):" The data under the Value 1 column of the You Have Values group 490 equals 512. Accordingly, a health report presented by administration client 406 regarding the server named Frog/lris will include the statement: "Amount of Installed RAM (MB): 512." In this manner the actual values and an associated text description of a particular statistic may be presented to a system administrator to further enhance the value of the information presented by system 400.

The remainder of Recommendation Table 416 includes the optional column group 492 headings "Absurd Items". These columns represent various server configuration settings that the system 400 checks to determine if one or more items should be brought to the attention of the system administrator. As illustrated in FIG. 7E these items include such data as determining whether certain server platform statistics are enabled and checking that the Administrator has console access to a server. Any other columns or fields of table 416 not described herein are optional and left to the designers discretion.

The Comments Truth Table 415 is a look-up table for translating recommendation code into text phrases that are understandable by a human system administrator.

It will be obvious to those skilled in the arts that the number of tables, the arrangements of data therein and the types of data structures utilized for storing and maintaining the information described herein may vary without changing the results of the inventive process.

Administration Client Module

Administration Client Module 406 functions primarily to facilitate the presentation, typically visually, of source data, recommendations, indices, etc. to assist a human system administrator in determining that status of a server and how the health of the serer performance may be improved. As illustrated in FIG. 4, Administration Client Module 406 comprises server monitor tab user interface module 442, health report user interface module 444, charting user interface module 446, and an indices and threshold user interface module 448. These user interface modules allow a human system administrator to display any of the diagnostic recommendations, indices, source data and configuration settings associated with a monitored process, as illustrated herein. Such user interface modules, using known techniques, may be implemented in a Notes Template File as a collection of Notes forms, views and content documents like the recommendation code to text mapping documents. Such data may be displayed through the various user interface modules of Administration Client 406 as status in the server monitor page, server statistic graphs, a hierarchical display, such as a drill down table which may be implemented as a Notes view or a "C tree" display, and a Notes views and documents, e.g. configuration interface for threshold, etc. In addition, database 418 provides information to the administration client user interfaces for both current and historical data.

Figure 8A:
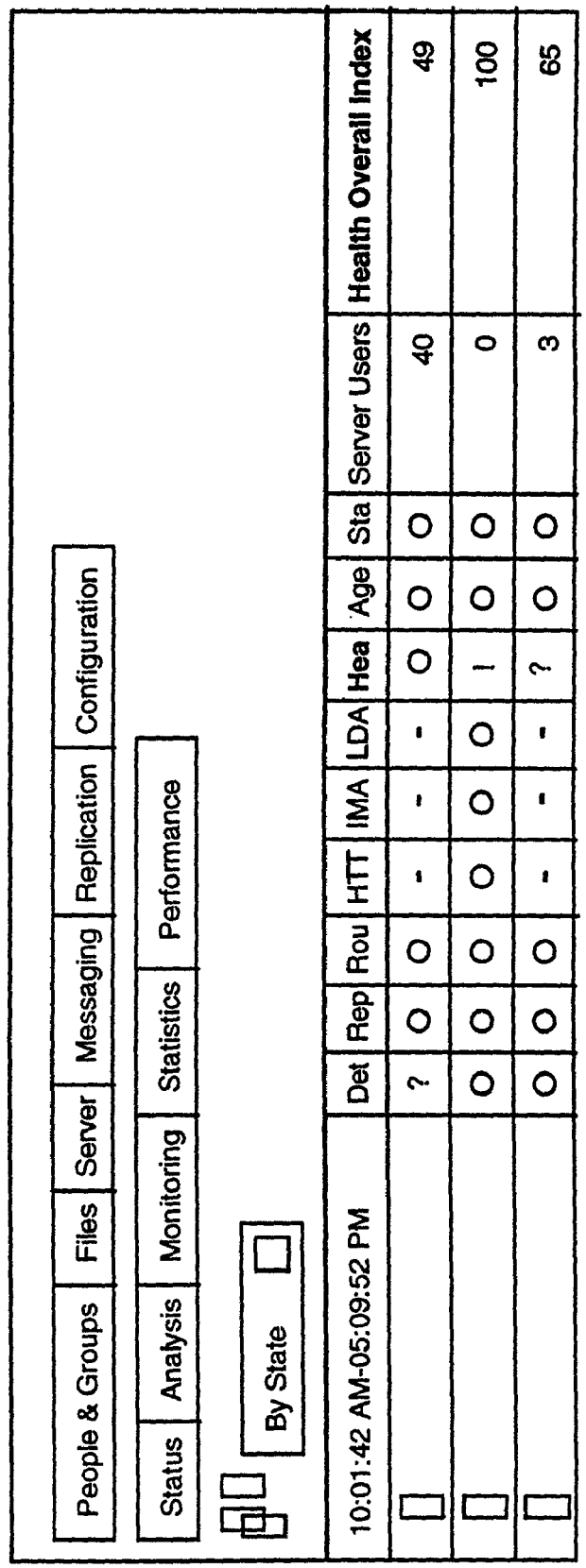

Administration Client Module 406 may generate several other user interfaces. The administrator can choose the server monitor tab user interface module 442 to see the status of all monitored server process, as illustrated in FIG. 8A. In FIG. 8A, the condition of a particular statistic is represented iconically along with the name of the server process, an over health index (composite index),etc. FIG. 8B illustrates an alternative user interface presentation of the same type of information in a text format. The system administrator can access the system 400 drill down tables which will provide more detailed analysis of the blended and discrete statistics are part of database 418. Such drill down tables contain information about the blended statistics, the raw Domino statistics that comprise the blended statistics, the weights used to blend the statistics, threshold values and dynamic and static recommendations for tuning. These drill down tables display how major blends are made from minor blends, which are then made from raw server statistics as a combination of discrete and composite statistics. In addition, a user may choose to see the historical statistics chartered via charting module user interface 446.

Figure 5:
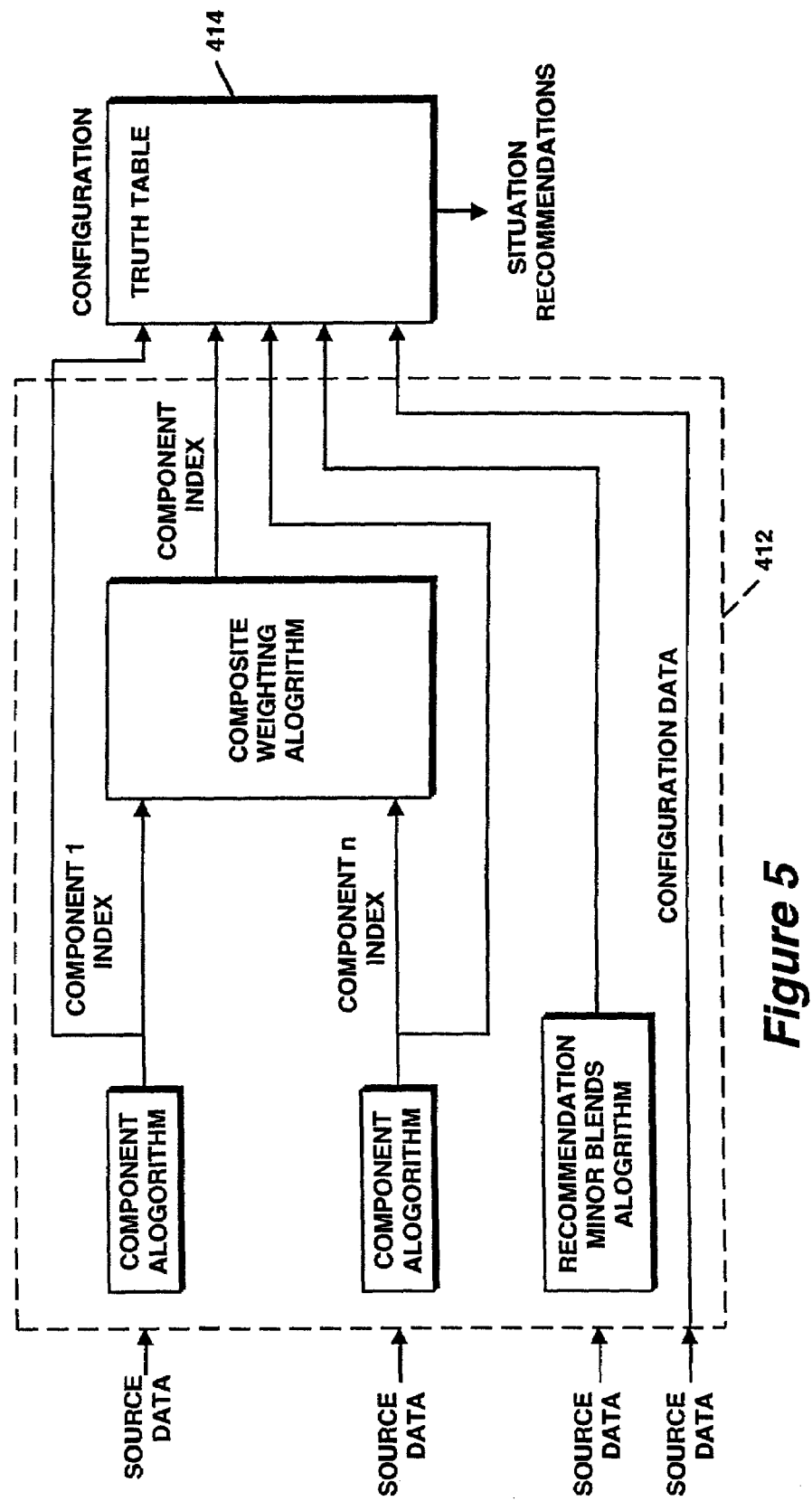
FIG. 5 illustrates conceptually the relationship between source data and various indexes and recommendations.
Figures 2, 7C:
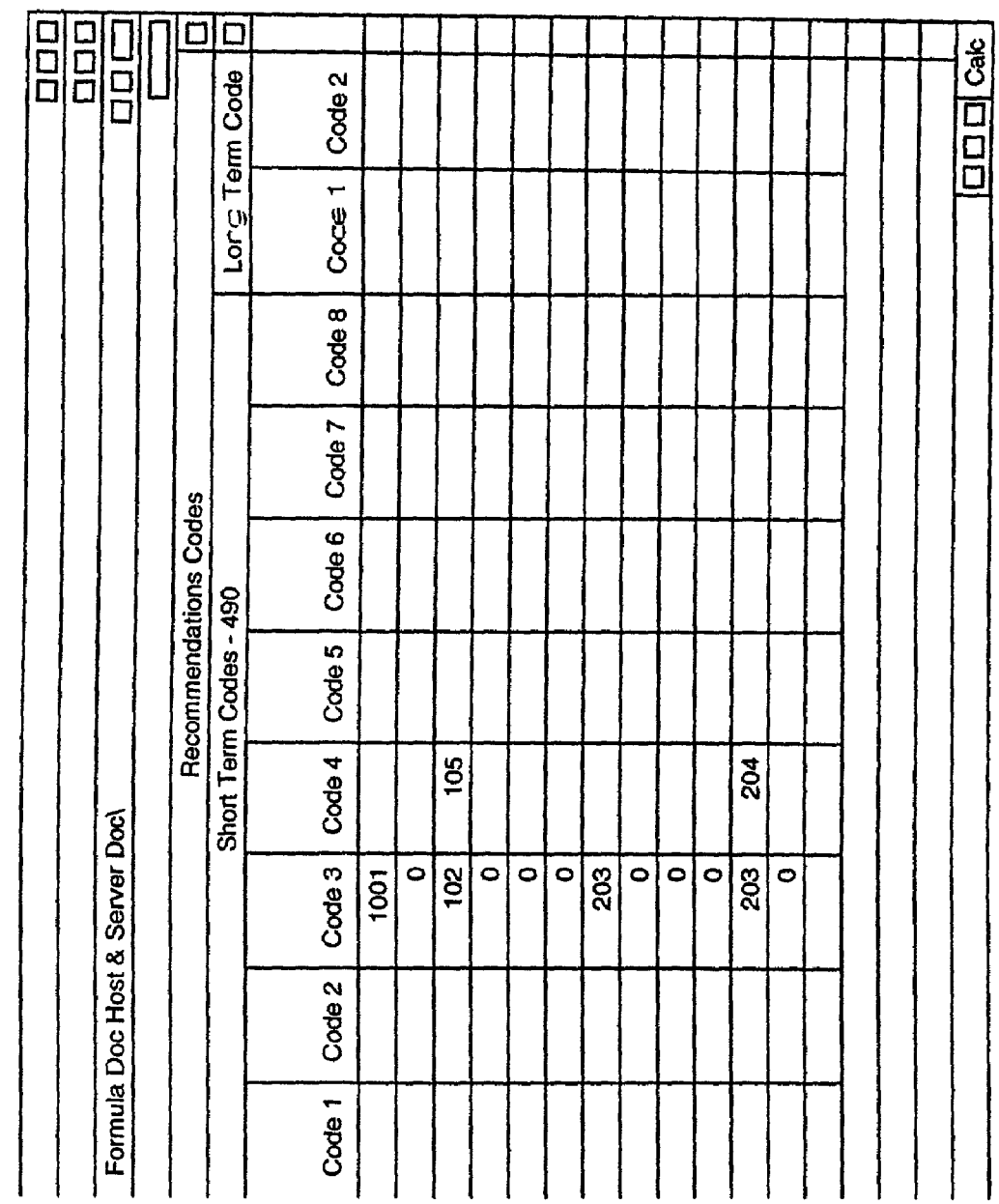
Figure 9:
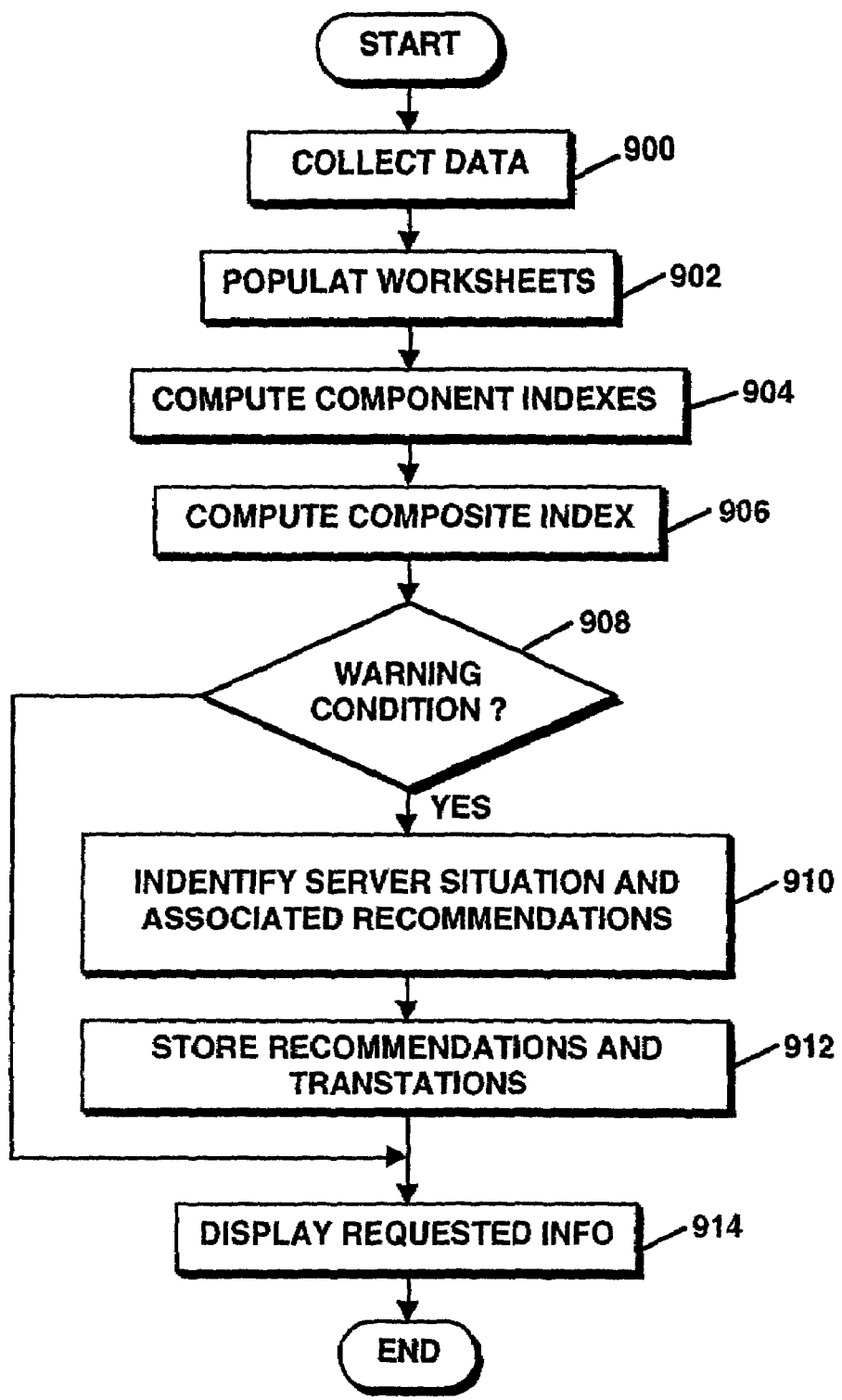
FIG. 9 illustrates conceptually form a flow chart illustrating the process steps performed by the diagnostic system of the present invention.

Having described the components of diagnostic system 400 used to collect the source data, generate a composite index and any recommendations, and present the same to a system administrator, the overall process performed by system 400 is described with reference to the flowchart of FIG. 9 and the conceptual diagram of FIG. 5. Specifically, FIG. 9 discloses the process steps performed by diagnostic system 400 and its component module in accordance with the present invention for each of the processes monitored in the network environment. It is contemplated within the present invention that multiple threads may be utilized to achieve the desired frequency of evaluation based on the number of processes to be monitored.

First, a system administrator designates, typically through the user interface of server monitor tab module 428, that he/she desires to monitor the health of one or more designated server processes. Collector task 405 will then be initiated and collector module 402 begins to collects the source data from a monitored process, as indicated in step 900. As described previously, the process of collecting source data may involve either pulling data from the monitored process by modules 402, and/or pushing of data from the monitored process to modules 402. Next, the collected source data is stored in memory and used to populate the plurality of worksheets 415 used by analyzer module 404, as indicated by step 902. Thereafter, the algorithmic formulas associated with the worksheets 412 are used to compute the individual values of all relevant component indexes, as indicated by step 904. Thereafter, given the values of the component indexes, the value of a composite index is generated using a weighing algorithm, as indicated by step 906. Next, if one or more of the component indexes indicates a warning condition for the monitored server process, as determined in decisional step 908, the values of the component and composite indexes, as well as data identifying the monitored process and configuration data are applied to the configuration truth table 414, as illustrated in step 909. Next the recommendation codes identified by any true conditions in configuration truth table 414 for the server process in question are written into recommendation table 416 to identify a known condition and any associated recommendations for resolving the known condition, as indicated by step 910. Next, to the extent not already done previously, the values of the relevant source data, configuration data, composite and component indexes, and recommendations, are stored in one or more memories or databases for access by the administrative client module 406, as indicated by step 912. Process steps 908-912 are repeated for any warning conditions present in the configuration source data, as well, although not shown in FIG. 9. Thereafter, the administration client module 406 responds to interactive commands and queries through the various graphic user interfaces generated thereby to present in a variety of different displayed formats data relating to one or more of the monitored servers, as indicated by step 914. If the system administrator generates a health report for a specific server, any recommendation codes within recommendation table 416 for the server process in question will be applied to the comments truth table 415 and the corresponding text presented as part of the server health report or display.

It will be obvious to those reasonably skilled in the arts that the various processes for collecting, computing, storing and displaying source data and recommendations, as described herein, may be reordered without substantially affecting the results of the process.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. For example, although the concepts of collecting configuration and statistical data, analyzing the data and providing recommendations have been described with reference to Domino server processes, such concepts may be equally applicable to a client/server system in which the server monitors the health of the client processes or in a peer-to-peer system of servers or clients.

Further, many of the system components described herein have been described using products from International Business Machines Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. In a computer system operatively coupled to at least one other computer system to be monitored, a method diagnosing the performance health of the monitored computer system comprising:
   (A) obtaining source data from the monitored computer system, the source data defining configuration settings and current values for a plurality of performance parameters of the monitored computer system;
   (B) deriving one or more indices from the source data, each index having a value within a predefined range of values and associated with a performance parameter of the monitored computer system;
   (C) using the value of the at least one index and at least a portion of the source data to identify one of a plurality of states as true, selected of the states having a diagnostic recommendation associated therewith; and
   (D) displaying the diagnostic recommendation associated with the identified state and the one of the indices.

2. The method of claim 1 wherein (A) comprises:
   (A1) querying the monitored computer system for source data.

3. The method of claim 1 wherein (A) comprises:
   (A1) receiving source data from the monitored computer system.

4. The method of claim 1 wherein (B) further comprises:
   (B1) deriving a plurality of component indices from the source data; and
   (B2) deriving a composite index from the plurality of component indices.

5. The method of claim 4 wherein (C) further comprises:
   (C1) using the composite index as an input condition into a compilation of states.

6. The method of claim 1 wherein (D) further comprises:
   (D1) providing access to the one or more of the indices.

7. The method of claim 1 wherein (D) further comprises:
   (D1) providing access to the source data.

8. The method of claim 1 wherein (D) further comprises:
   (D1) displaying any of the source data and configuration settings associated with a monitored computer system.

9. The method of claim 1 wherein the compilation of states comprises: a plurality of tables, each table comprising a plurality of entries.

10. The method of claim 9 wherein the plurality of tables comprises:
a configuration truth table; and
a diagnostic recommendations table.

11. A computer program product for use with a computer system operatively coupled to at least one other computer system to be monitored, the computer program product comprising a computer useable medium having embodied therein program code comprising:
(A) program code for obtaining source data from the monitored computer system, the source data defining a current value for a plurality of performance parameters of the monitored computer system;
(B) program code for deriving one or more indices from the source data, each index having a value within a predefined range of values and associated with a performance parameter of the monitored computer system;
(C) program code for using the value of the at least one index and at least a portion of the source data to identify one of a plurality of states as true, selected of the states having a diagnostic recommendation associated therewith;
(D) program code for providing access to the diagnostic recommendations associated with an identified state and the one of the indices.

12. The computer program product of claim 11 wherein (A) comprises:
(A1) program code for querying the at least one other computer system for source data.

13. The computer program product of claim 11 wherein (A) comprises:
(A1) program code for receiving source data from the monitored computer system.

14. The computer program product of claim 11 wherein (B) further comprises:
(B1) program code for deriving a plurality of component indices from the source data; and
(B2) program code for deriving a composite index from the plurality of component indices.

15. The computer program product of claim 14 wherein (C) further comprises:
(C1) program code for using the composite index as an input condition into the compilation of states.

16. The computer program product of claim 11 wherein (D) further comprises:
(D1) program code for providing access to the one or more of the indices.

17. The computer program product of claim 11 wherein (D) further comprises:
(D1) program code for providing access to the source data.

18. The computer program product of claim 11 wherein (D) further comprises:
(D1) program code for displaying any of the source data and settings associated with a monitored computer system.

19. The computer program product of claim 11 wherein the compilation of states comprises:
a plurality of tables, each table comprising a plurality of entries.

20. The computer program product of claim 19 wherein the plurality of tables comprises:
a configuration truth table; and
a diagnostic recommendations table.

21. Apparatus for use with a computer system operatively coupled to at least one other computer system to be monitored, the apparatus comprising:
(A) program logic, stored in a memory of said apparatus, for obtaining source data from the monitored computer system, the source data defining a current value for a plurality of performance parameters associated with the monitored computer system;
(B) program logic, stored in the memory, for deriving one or more indices from the source data;
(C) the memory further storing a plurality of state situations entries, selected of the state situation entries having a diagnostic recommendation associated therewith;
(D) program logic, stored in the memory, for using the value of the at least one index and at least a portion of the source data to identify one of a plurality of state entries as true; and
(E) program logic, stored in the memory, for displaying diagnostic recommendations associated with an identified state situation entry and the one of the indices.

22. The apparatus of claim 21 wherein (A) comprises:
(A1) program logic, stored in the memory, for querying the at least one other computer system for source data.

23. The apparatus of claim 21 wherein (A) comprises:
(A1) program logic, stored in the memory, for receiving source data from the monitored computer system.

24. The apparatus of claim 21 wherein (B) further comprises:
(B1) program logic, stored in the memory, for deriving a plurality of component indices from the source data; and
(B2) program logic, stored in the memory, for deriving a composite index from the plurality of component indices.

25. The apparatus of claim 24 wherein (D) further comprises:
(D1) program logic, stored in the memory, for using the composite index as an input condition into a compilation of states.

26. The apparatus of claim 21 wherein (E) further comprises:
(E1) program logic, stored in the memory, for providing access to the one or more of the indices.

27. The apparatus of claim 21 wherein (E) further comprises:
(E1) program logic, stored in the memory, for providing access to the source data.

28. The apparatus of claim 21 wherein (E) further comprises:
(E1) program logic, stored in the memory, for displaying any of the indices, source data and configuration settings associated with a monitored computer system.

29. The apparatus of claim 25 wherein the compilation of states comprises:
a plurality of tables, each table comprising a plurality of entries.

30. The apparatus of claim 29 wherein the plurality of tables comprises:
a configuration truth table; and
a diagnostic recommendations table.

31. A memory for storing data to be processed by a data processing system including an apparatus for monitoring and analyzing the performance of a process operatively coupled to a data processing system, the memory comprising:
a data structure stored in the memory and usable to identify recommended diagnostic actions for affecting the performance of a process, the data structure comprising:

(a) identification data identifying one of a plurality of processes monitored by the data processing system, and (b) a plurality of process state situation entries associated with a monitored process identified by the identification data, each state situation entry having associated therewith:

(i) an index having a value within a predefined range of values and associated with a performance parameter of the monitored process identified by the identification data, (ii) configuration data identifying a configuration parameter of the monitored process identified by the identification data, and (iii) recommendation data identifying at least one recommended diagnostic action to affect performance of a parameter of the monitored process identified by the identification data; and program logic, stored in the memory, for displaying the recommended diagnostic action identified by the recommendation data and the index.

32. A memory for storing data to be processed by a data processing system including an apparatus for monitoring and analyzing the performance of a process operatively coupled to a data processing system, the memory comprising:

a data structure stored in the memory and usable to identify the performance health of a process, the data structure comprising:

(a) identification data identifying one of a plurality of processes monitored by the data processing system, (b) a plurality component indexes, each of the component indexes having a numeric value within a predefined range of values and associated with a performance parameter of the monitored process identified by the identification data; and (c) a composite index derived from the plurality of component indices and indicating the overall performance health of the monitored process identified by the identification data; and program logic, stored in the memory, for displaying the overall performance health of the monitored process and the composite index.

33. The apparatus of claim 32 wherein one of the component indexes is associated with performance parameter of the monitored process selected from the group consisting of processor utilization, memory utilization, disk utilization, network utilization, mail delivery latency performance, address resolution performance, server response, HTTP response, LDAP response, and IMAP response.

* * * * *